(12) United States Patent
Wang et al.

(10) Patent No.: US 11,373,641 B2
(45) Date of Patent: Jun. 28, 2022

(54) INTELLIGENT INTERACTIVE METHOD AND APPARATUS, COMPUTER DEVICE AND COMPUTER READABLE STORAGE MEDIUM

(71) Applicant: Shanghai Xiaoi Robot Technology Co., Ltd., Shanghai (CN)

(72) Inventors: Hui Wang, Shanghai (CN); Shijing Yu, Shanghai (CN); Pinpin Zhu, Shanghai (CN)

(73) Assignee: Shanghai Xiaoi Robot Technology Co., Ltd., Shanghai (CN)

( * ) Notice: Subject to any disclaimer, the term of this patent is extended or adjusted under 35 U.S.C. 154(b) by 74 days.

(21) Appl. No.: 16/414,293

(22) Filed: May 16, 2019

(65) Prior Publication Data
US 2019/0295533 A1    Sep. 26, 2019

Related U.S. Application Data

(63) Continuation-in-part of application No. PCT/CN2019/073141, filed on Jan. 25, 2019.

(30) Foreign Application Priority Data

Jan. 26, 2018   (CN) .......................... 201810079267.2

(51) Int. Cl.
*G10L 15/18* (2013.01)
*G10L 15/05* (2013.01)
(Continued)

(52) U.S. Cl.
CPC .......... *G10L 15/1815* (2013.01); *G10L 15/05* (2013.01); *G10L 15/22* (2013.01);
(Continued)

(58) Field of Classification Search
None
See application file for complete search history.

(56) References Cited

U.S. PATENT DOCUMENTS 9,818,406 B1 * 11/2017 Chan ...................... G10L 15/02
2002/0198717 A1 * 12/2002 Oudeyer ................. G10L 13/10
                                                              704/270
(Continued)

FOREIGN PATENT DOCUMENTS

CN         103531198 A      1/2014
CN         103593054 A      2/2014
(Continued)

OTHER PUBLICATIONS

International Search Report, PCT/CN2019/073141, dated Mar. 15, 2019.
(Continued)

*Primary Examiner* — Stella L. Woo
(74) *Attorney, Agent, or Firm* — Flener IP & Business Law; Zareefa B. Flener

(57) ABSTRACT

Embodiments of the present invention provide an intelligent interactive method and apparatus, a computer device and a computer readable storage medium, which solves problems that a deep intention of a user message cannot be analyzed in an intelligent interactive manner in the prior art and humanized interactive experiences cannot be provided. The intelligent interactive method includes: obtaining an emotion recognition result according to a user message, where the user message includes at least a user voice message; performing an intention analysis according to a text content of the user voice message to obtain corresponding basic intention information; and determining a corresponding interactive instruction according to the emotion recognition result and the basic intention information.

19 Claims, 12 Drawing Sheets

(51) Int. Cl.
  *G10L 15/22*  (2006.01)
  *G10L 25/21*  (2013.01)
  *G10L 25/24*  (2013.01)
  *G10L 25/63*  (2013.01)
  *G10L 25/90*  (2013.01)
(52) U.S. Cl.
  CPC .............. *G10L 25/21* (2013.01); *G10L 25/24* (2013.01); *G10L 25/63* (2013.01); *G10L 25/90* (2013.01); *G10L 2015/223* (2013.01)

(56) References Cited

U.S. PATENT DOCUMENTS

| | | | | |
|---|---|---|---|---|
| 2007/0100628 | A1* | 5/2007 | Bodin | G10L 13/033 704/261 |
| 2014/0112556 | A1* | 4/2014 | Kalinli-Akbacak | G06K 9/00302 382/128 |
| 2014/0114655 | A1* | 4/2014 | Kalinli-Akbacak | G10L 25/63 704/231 |
| 2014/0236596 | A1* | 8/2014 | Martinez | G06F 40/30 704/235 |
| 2016/0027452 | A1* | 1/2016 | Kalinli-Akbacak | G10L 25/63 704/240 |
| 2016/0372110 | A1* | 12/2016 | Waltermann | G10L 15/22 |
| 2017/0084295 | A1* | 3/2017 | Tsiartas | G10L 17/02 |
| 2017/0160813 | A1* | 6/2017 | Divakaran | G06K 9/00335 |
| 2018/0053503 | A1* | 2/2018 | Ogunyoku | G08B 25/016 |
| 2018/0082679 | A1* | 3/2018 | McCord | G10L 13/033 |
| 2018/0124242 | A1* | 5/2018 | Zimmerman | G06F 40/35 |
| 2018/0144761 | A1* | 5/2018 | Amini | G06T 13/40 |
| 2018/0178372 | A1* | 6/2018 | Lee | B25J 9/1697 |
| 2018/0254041 | A1* | 9/2018 | Harper | G10L 25/51 |
| 2018/0314689 | A1* | 11/2018 | Wang | G10L 15/22 |
| 2018/0357286 | A1* | 12/2018 | Wang | G06F 16/24578 |
| 2019/0188261 | A1* | 6/2019 | Herzig | G06F 40/35 |

FOREIGN PATENT DOCUMENTS

| | | |
|---|---|---|
| CN | 106537294 A | 3/2017 |
| CN | 106570496 A | 4/2017 |
| CN | 106658129 A | 5/2017 |
| CN | 106776936 A | 5/2017 |
| CN | 107437415 A | 12/2017 |
| CN | 107516511 A | 12/2017 |
| CN | 107562816 A | 1/2018 |
| CN | 108197115 A | 6/2018 |
| JP | 2000194385 A | 7/2000 |
| JP | 2002123289 A | 4/2002 |
| JP | 2003162294 A | 6/2003 |
| JP | 2003345727 A | 12/2003 |
| JP | 2004090109 A | 3/2004 |
| JP | 2006190101 A | 7/2006 |
| JP | 2006313287 A | 11/2006 |
| JP | 2007286377 A | 11/2007 |
| JP | 2012137680 A | 7/2012 |
| JP | 2017009826 A | 1/2017 |
| JP | 2017156854 A | 9/2017 |

OTHER PUBLICATIONS

Notice of Reasons for Refusal, Japanese Patent Application No. 2020-540499, dated Jun. 15, 2021.

* cited by examiner

INTELLIGENT INTERACTIVE METHOD AND APPARATUS, COMPUTER DEVICE AND COMPUTER READABLE STORAGE MEDIUM

CROSS-REFERENCE TO RELATED APPLICATIONS

This application is a Continuation-In-Part Application of PCT application No. PCT/CN2019/073141, filed on Jan. 25, 2019 which claims priority to Chinese Patent Application No. 201810079267.2, filed on Jan. 26, 2018. All of the aforementioned applications are incorporated herein by reference in their entireties.

TECHNICAL FIELD

The present invention relates to the technical field of intelligent interactions, and in particular, to an intelligent interactive method and apparatus, a computer device and a computer readable storage medium.

BACKGROUND

With the continuous development of artificial intelligence technologies and the continuous improvement of people's requirements for interactive experiences, an intelligent interaction mode has gradually begun to replace some traditional human-computer interaction modes, and has become a research hotspot. However, based on the existing intelligent interaction mode, only a semantic content of a user message can be roughly analyzed, and a current emotional state of a user cannot be identified, and thus deep emotional needs that a user message actually wants to express cannot be analyzed according to the emotional state of the user. It is also impossible to provide a more humanized interactive experience according to the user message. For example, for a user who is in a hurry and has an emotional state of anxiety and a user who is just starting to make a schedule and has an emotional state of peace, when they inquire flight time information, their desired responses are definitely different. However, in the existing semantic-based intelligent interactive mode, responses to different users are the same, for example, providing only a corresponding flight time information program to the users.

SUMMARY

In view of this, embodiments of the present invention provide an intelligent interactive method and apparatus, a computer device and a computer readable storage medium, which solves problems that a deep intention of a user message cannot be analyzed in an intelligent interactive manner in the prior art and humanized interactive experiences cannot be provided.

An embodiment of the present invention provides an intelligent interactive method, including: obtaining an emotion recognition result according to a user message, where the user message includes at least a user voice message;

performing an intention analysis according to a text content of the user voice message to obtain corresponding basic intention information; and determining a corresponding interactive instruction according to the emotion recognition result and the basic intention information.

An embodiment of the present invention provides an intelligent interactive apparatus, including:

an emotion recognition module, configured to obtain an emotion recognition result according to a user message, where the user message includes at least a user voice message;

a basic intention recognition module, configured to perform an intention analysis according to a text content of the user voice message to obtain corresponding basic intention information; and an interactive instruction determining module, configured to determine a corresponding interactive instruction according to the emotion recognition result and the basic intention information.

An embodiment of the present invention provides a computer device, including a memory, a processor, and a computer program stored on the memory for execution by the processor, where when executing the computer program, the processor implements steps of the foregoing method.

An embodiment of the present invention provides a computer readable storage medium on which a computer program is stored, where when executed by a processor, the computer program implements steps of the foregoing method.

According to the intelligent interactive method and apparatus, the computer device and the computer readable storage medium provided in the embodiments of the present invention, on the basis of understanding the basic intention information of a user, in combination with the emotion recognition result obtained based on the user message, the interactive instruction with emotion are further provided according to the basic intention information and the emotion recognition result, which solves problems that a deep intention of the user message cannot be analyzed in an intelligent interactive mode in the prior art and humanized interactive experiences cannot be provided.

DETAILED DESCRIPTION

In order to make objectives, technical means and advantages of the present invention clearer, a further detailed description on the present invention will be given below in combination with accompanying drawings.

The technical solutions in the embodiments of the present invention will be clearly and described as below with reference to the accompanying drawings in the embodiments of the present invention. Apparently, the embodiments described below are merely a part but not all of the embodiments of the present invention. All other embodiments obtained by those skilled in the art based on the embodiments of the present invention without paying any creative effort shall fall into the protection scope of the present invention.

Figure 1:
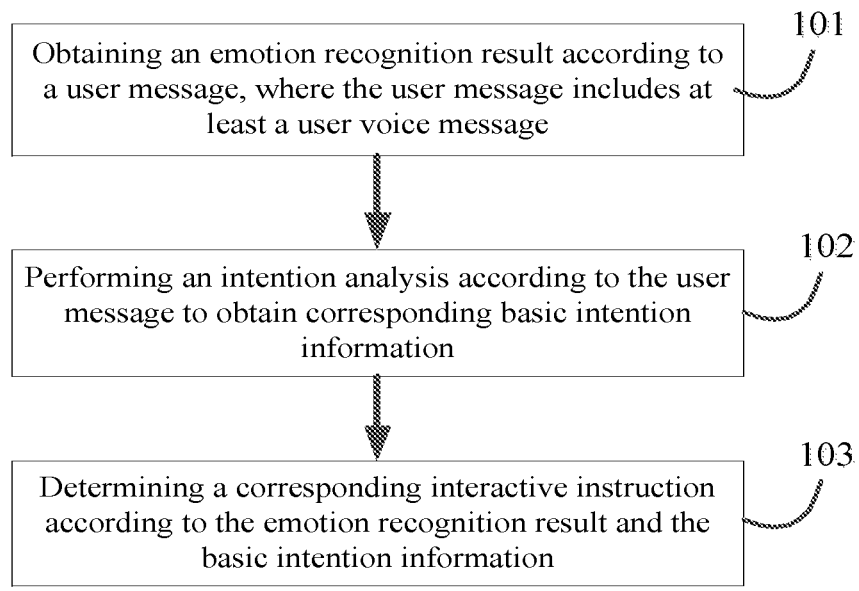
FIG. 1 is a schematic flow diagram of an intelligent interactive method provided in an embodiment of the present invention.

FIG. 1 is a schematic flow diagram of an intelligent interactive method provided in an embodiment of the present invention. As shown in FIG. 1, the intelligent interactive method includes the following steps:

Step 101: obtaining an emotion recognition result according to a user message, where the user message includes at least a user voice message.

The user message refers to information that is related to user's interactive intention and needs and that is input or obtained by a user during interaction with the user. For example, in a customer service interactive scenario of a call center system, a specific form of a user message may include a user voice message sent by a user, and the user in this case may be a client or a server. For another example, in an intelligent robot interactive scenario, a user message may include information input by a user (for example, text or voice) through an input module of an intelligent robot, or user information (such as a facial expression, an action posture) collected by a collection module of the intelligent robot. The present invention does not limit a specific source and a specific form of the user message.

It should be understood that manners in which the emotion recognition result is obtained may also vary depending on different specific forms of the user message. For example, when a user message includes an obtained facial expression of a user, a current emotional state of the user can be determined by recognizing a position change of facial feature points in an image. The present invention does not limit a specific manner of obtaining the emotion recognition result according to the user message. For another example, when a user message includes a user voice message, since audio data of the user voice message of different emotional states may include different audio features, an audio emotion recognition result may be obtained according to an audio data of the user voice message in this case, and an emotion recognition result may be determined according to the audio emotion recognition result.

The emotion recognition result obtained according to the user message will be combined with basic intention information in a subsequent process, to infer a user's emotional intention, or directly provide an interactive instruction with emotion based on the basic intention information and the emotion recognition result.

Step 102: performing an intention analysis according to the user message to obtain corresponding basic intention information.

The basic intention information corresponds to an intention intuitively reflected by the user message, but it cannot reflect real emotional needs of the user in a current state. Therefore, it is necessary to combine the emotion recognition result to comprehensively determine a deep intention and emotional needs that the user message actually wants to express. For example, for a user who is in a hurry and has an emotional state of anxiety and a user who is just starting to make a schedule and has an emotional state of peace, when contents of user voice messages sent by both of them are flight information inquiry, the basic intention information obtained is the same, both are the flight information inquiry. However, emotional needs of the two are obviously different.

It should be understood that specific contents and obtaining manners of the basic intention information may also vary depending on different specific forms of the user message. For example, when the user message includes a user voice message, the basic intention information may be obtained through intention analysis based on a text content of the user voice message, where the basic intention information corresponds to an intention semantically reflected by the text content of the user voice message, without carrying any emotional meaning.

In an embodiment of the present invention, in order to further improve accuracy of obtained basic intention information, intention analysis may also be performed according to the current user voice message, in combination with a previous user voice message and/or a subsequent user voice message, to obtain the corresponding basic intention information. For example, some keywords and slots (slot) may be lacking in an intention of the current user voice message, but such content may be obtained through a previous user voice message and/or a subsequent user voice message. For example, a content of the current user voice message is "Any special products?", in this case a subject (slot) is missing. However, in combination with a previous user voice message "How is the weather in Changzhou?", the "Changzhou" can be extracted as the subject, so that basic intention information of the current user voice message finally obtained may be "Are there any special products in Changzhou?".

Step 103: determining a corresponding interactive instruction according to the emotion recognition result and the basic intention information.

A correspondence between the interactive instruction and both the emotion recognition result and the basic intention information may be established through a learning process. In an embodiment of the present invention, contents and forms of the interactive instruction includes one or more of the following sentiment presentation modes: a text output sentiment presentation mode, a music play sentiment presentation mode, a voice sentiment presentation mode, an image sentiment presentation mode, and a mechanical action sentiment presentation mode. However, it should be understood that a specific sentiment presentation mode of the interactive instruction may also be adjusted according to requirements of an interaction scenario. The specific content and form of the interactive instruction are not limited in the present invention.

In an embodiment of the present invention, corresponding emotional intention information may be first determined according to the emotion recognition result and the basic intention information; and then the corresponding interactive instruction is determined according to the emotional intention information, or the corresponding interactive instruction is determined according to the emotional intention information and the basic intention information. The emotional intention information in this case may include a specific content.

Specifically, the specific content of the emotional intention information refers to intention information having emotional meaning, which can reflect emotional needs of a user message while reflecting a basic intention, and a correspondence between the emotional intention information and both the emotion recognition result and the basic intention information may be pre-established through a pre-learning process. In an embodiment of the present invention, the emotional intention information may include sentiment need information corresponding to the emotion recognition result, or may include sentiment need information corresponding to the emotion recognition result and an association relationship between the emotion recognition result and the basic intention information. The association relationship between the emotion recognition result and the basic intention information may be predefined (for example, based on rule setting or logical judgment). For example, when a content of the emotion recognition result is "anxiety" and a content of the basic intention information is "Reporting the loss of credit card", a determined content of the emotional intention information may include an association relationship between the emotion recognition result and the basic intention information: "Reporting the loss of credit card. The user is very anxious, and the credit card may be lost or stolen", and a determined sentiment need information may be "comfort". The relationship between the emotion recognition result and the basic intention information may also be a model obtained based on a specific training process (for example, a trained end-to-end model, which may directly output a sentiment intention by inputting the emotion recognition result and the basic intention information). This training model may be a fixed deep network model (for example, including preset rules), or may be continuously updated through online learning (for example, by using an enhanced learning model, objective functions and reward functions are set in the model, and with the number of man-machine interactions increases, the deep network model may also be continuously updated and evolved).

However, it should be understood that the emotional intention information may also exist only as an identifier of a mapping relationship. A correspondence between the emotional intention information and the interactive instruction, and the correspondence between the interactive instruction and both the emotional intention information and the basic intention information may also be pre-established through a pre-learning process.

It should be understood that, in some application scenarios, it needs to present a feedback content of the emotional intention information. For example, in some customer service interactive scenarios, it needs to present emotional intention information obtained through analysis based on a voice content of a customer to customer service personnel to serve as a reminder function. In this case, it is necessary to determine corresponding emotional intention information, and present a feedback content of the emotional intention information. However, in other application scenarios, the corresponding interactive instruction needs to be directly given, and the feedback content of the emotional intention information does not need to be presented. In this case, the corresponding interactive instruction may also be directly determined according to the emotion recognition result and the basic intention information, without needing to generate the emotional intention information.

In an embodiment of the present invention, in order to further improve accuracy of obtained emotional intention information, the corresponding emotional intention information may also be determined according to the emotion recognition result and the basic intention information of a current user voice message, in combination with the emotion recognition result and the basic intention information of a previous user voice message and/or a subsequent user voice message. In this case, the emotion recognition result and the basic intention information of the current user voice message needs to be recorded in real time, so as to be used as a reference when the emotional intention information is determined according to another user voice message. For example, a content of a current user voice message is "How to withdraw money without a bank card?", and obtained emotion recognition result is "anxious". However, the reason for the "anxious" emotion cannot be accurately determined according to the current user voice message. In this case, previous user voice messages and/or subsequent user voice messages may be traced, and a result shows that one of the previous user voice messages is "How to report the bank card?". Therefore, it may be inferred that the user's emotional intention information may be "the loss of a bank card causes an emotional anxiety, and the user hopes to inquiry how to report the loss of a bank card or withdraw money without a bank card". In this case, an interactive instruction for the emotional intention information may be generated, for example, playing the following comfort voice, "To withdraw money without a card, please follow the steps below. Please do not worry. If you lose a bank card, you can follow the instructions below . . . ".

In an embodiment of the present invention, in order to further improve accuracy of an obtained corresponding interactive instruction, the corresponding interactive instruction may also be determined according to the emotional intention information and the basic intention information of the current user voice message, in combination with the emotional intention information and the basic intention information of a previous user voice message and/or a subsequent user voice message. In this case, the emotion recognition result and the basic intention information of the current user voice message needs to be recorded in real time, so as to be used as a reference when the interactive instruction is determined according to another user voice message.

It can be seen that, according to the intelligent interactive method provided in the embodiment of the present invention, on the basis of understanding the basic intention information of a user, in combination with the emotion recognition result obtained based on the user message, the user emotional intention is further inferred, or the interactive instruction with emotion is directly given based on the basic intention information and the emotion recognition result. This solves problems that a deep intention and emotional needs of a user message cannot be analyzed in an intelligent interactive manner in the prior art and humanized interactive experiences cannot be provided.

In an embodiment of the present invention, when the user message includes the user voice message, the emotion recognition result may be comprehensively determined according to an audio emotion recognition result and a text emotion recognition result. Specifically, the audio emotion recognition result needs to be obtained according to audio data of the user voice message, and the text emotion recognition result needs to be obtained according to a text content of the user voice message, and then the emotion recognition result is comprehensively determined according to the audio emotion recognition result and the text emotion recognition result. However, as described above, a final emotion recognition result may also be determined based on only the audio emotion recognition result, which is not limited in the present invention.

It should be understood that the audio emotion recognition result and the text emotion recognition result may be represented in a plurality of manners. In an embodiment of the present invention, an emotion recognition result may be represented in a discrete emotion classification manner. In this case, audio emotion recognition results and text emotion recognition results may include one or more of a plurality of emotion classifications, respectively. For example, in a customer service interactive scenario, the plurality of emotion classifications may include: a satisfaction classification, a calm classification, and an irritation classification, in response to a possible emotional state of a user in the customer service interactive scenario; or the plurality of emotion classifications may include: a satisfaction classification, a calm classification, an irritation classification, and an anger classification, in response to a possible emotional state of customer service personnel in the customer service interactive scenario. However, it should be understood that types and quantities of these emotion classifications may be adjusted according to actual application scenario requirements, and are not strictly limited in the present invention either. In a further embodiment, each emotion classification may also include a plurality of emotion intensity levels. Specifically, the emotion classification and the emotion intensity level may be considered as two dimensional parameters, and may be independent of each other (for example, each emotion classification has a corresponding N emotion intensity levels, such as low, moderate, and high), or may have a preset correspondence (for example, the "irritation" emotion classification includes three emotion intensity levels: low, moderate, and high; and the "satisfaction" emotion classification includes only two emotion intensity levels: moderate and high). It can be seen that, the emotion intensity level in this case may be considered as an attribute parameter of the emotion classification. When an emotion classification is determined through an emotion recognition process, an emotion intensity level of the emotion classification is also determined.

In another embodiment of the present invention, a non-discrete dimensional emotion model may also be used to represent the emotion recognition result. In this case, the audio emotion recognition result and the text emotion recognition result respectively correspond to one coordinate point in a multi-dimensional emotion space, and each dimension in the multi-dimensional emotion space corresponds to a psychologically defined sentiment factor. For example, a PAD (Pleasure, Arousal, Dominance) three-dimensional emotion model may be used. According to the model, an emotion includes three dimensions: pleasure, arousal and dominance. Each emotion can be represented by a sentiment factor respectively corresponding to the three dimensions. P represents pleasure, indicating a positive feature of an individual's emotional state; A represents arousal, indicating a level of arousal of individual's nerves; D represents dominance, indicating an individual's state of control over a situation and others.

It should be understood that the audio emotion recognition result and the text emotion recognition result may also be represented in another representation manner, and the representation manner is not specifically limited in the present invention.

Figure 2:
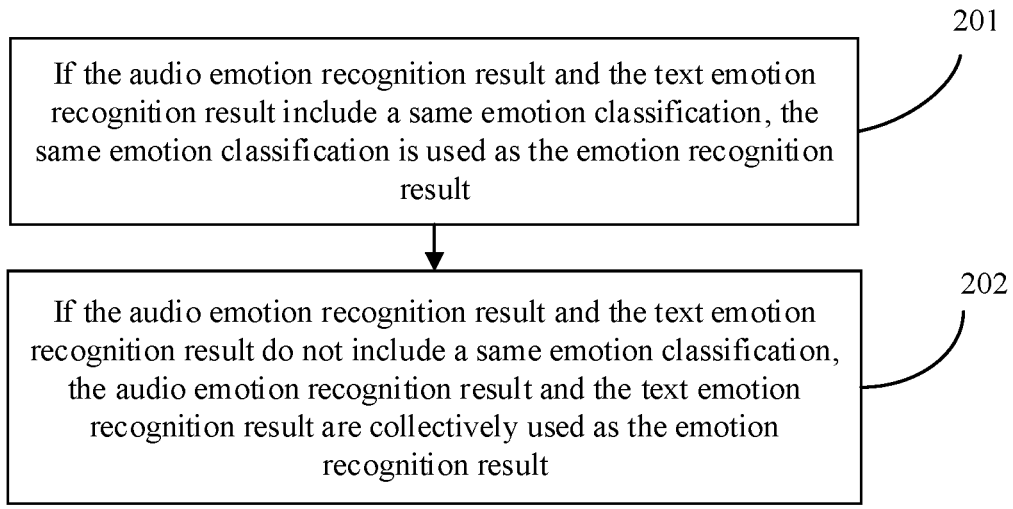
FIG. 2 is a schematic flow diagram of determining an emotion recognition result in an intelligent interactive method provided in an embodiment of the present invention.

FIG. 2 is a schematic flow diagram of determining an emotion recognition result in an intelligent interactive method provided in an embodiment of the present invention. A user message in this embodiment includes at least a user voice message. The emotion recognition result needs to be comprehensively determined according to an audio emotion recognition result and a text emotion recognition result, and the audio emotion recognition result and the text emotion recognition result include one or more of a plurality of emotion classifications, respectively. In this case, a method of determining the emotion recognition result may include the following steps:

Step 201: If the audio emotion recognition result and the text emotion recognition result include a same emotion classification, the same emotion classification is used as the emotion recognition result.

Step 202: If the audio emotion recognition result and the text emotion recognition result do not include a same emotion classification, the audio emotion recognition result and the text emotion recognition result are collectively used as the emotion recognition result.

It should be understood that, although step 202 defines that when the audio emotion recognition result and the text emotion recognition result do not include a same emotion classification, the audio emotion recognition result and the text emotion recognition result are collectively used as the emotion recognition result, a more conservative interactive strategy may also be adopted in another embodiment of the present invention, for example, error information is directly generated or no emotion recognition result is output, so as to avoid misleading an interaction process. A manner for processing a case in which the audio emotion recognition result and the text emotion recognition result do not include a same emotion classification is not strictly limited in the present invention.

Figure 3:
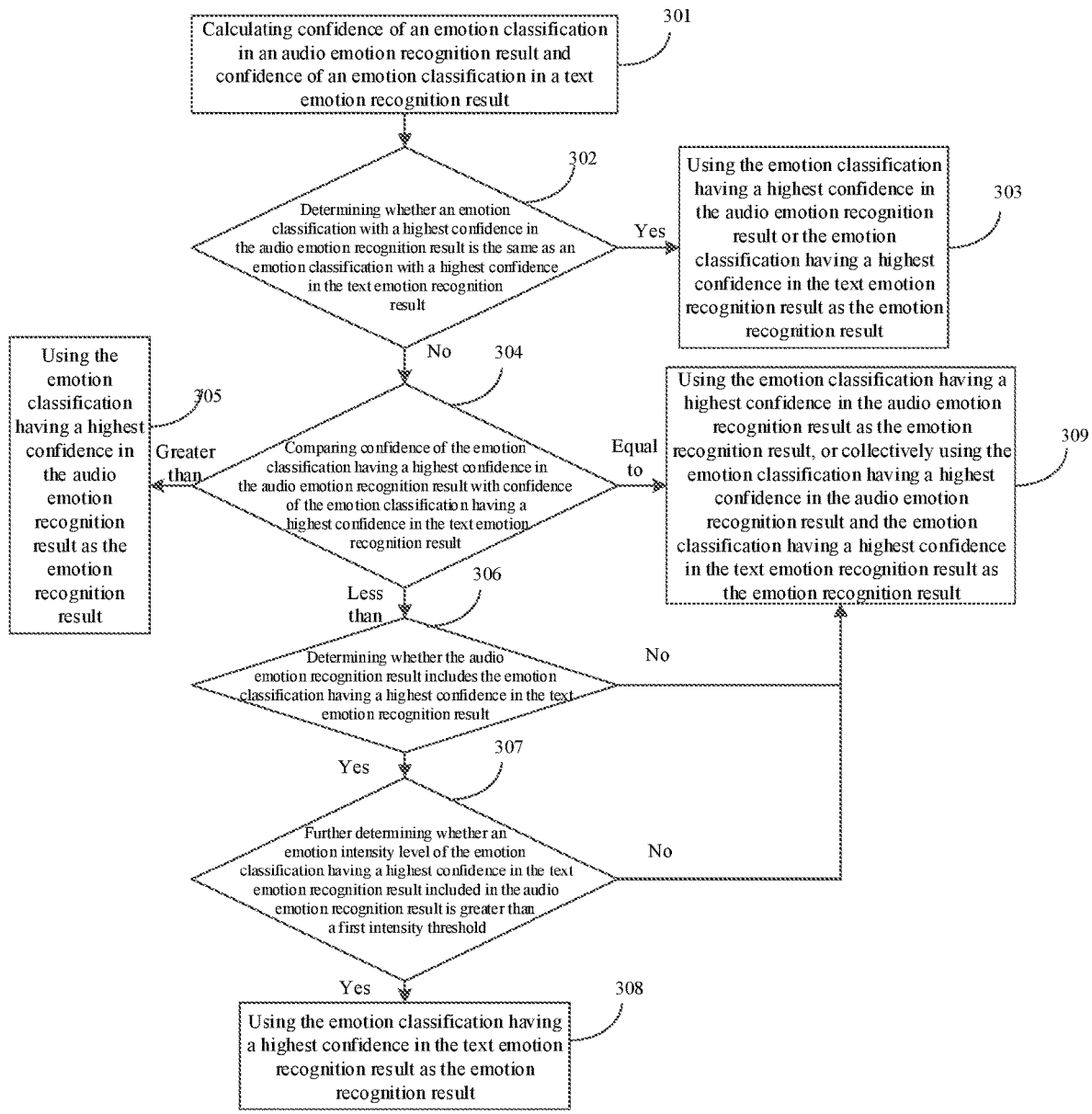
FIG. 3 is a schematic flow diagram of determining an emotion recognition result in an intelligent interactive method provided in an embodiment of the present invention.

FIG. 3 is a schematic flow diagram of determining an emotion recognition result in an intelligent interactive method provided in an embodiment of the present invention. A user message in this embodiment also includes at least a user voice message. The emotion recognition result also needs to be comprehensively determined according to an audio emotion recognition result and a text emotion recognition result, and the audio emotion recognition result and the text emotion recognition result include one or more of a plurality of emotion classifications, respectively. A method of determining the emotion recognition result may include the following steps:

Step 301: calculating confidence of an emotion classification in an audio emotion recognition result and confidence of an emotion classification in a text emotion recognition result.

Statistically, the confidence is also referred to as reliability, confidence level, or confidence coefficient. Since sampling is random, when a sample is used to estimate a population parameter, a conclusion obtained is always uncertain. Therefore, an interval estimation method in mathematical statistics may be used to estimate a probability that an error between an estimated value and the population parameter is within a certain allowable range, and the corresponding probability is referred to as confidence. For example, it is assumed that a preset emotion classification is related to a variable for representing the emotion classification, that is, the emotion classification may correspond to different values according to a size of the variable. When the confidence of a voice emotion recognition result needs to be obtained, a plurality of measurement values of the variable are first obtained through a plurality of processes of audio emotion recognition/text emotion recognition, and then an average of the plurality of measurement values is taken as an estimated value. Then a probability that an error between the estimated value and a truth value of the variable is within a certain range is estimated by using an interval estimation method. The larger the probability, the more accurate the estimated value, that is, the higher the confidence of the current emotion classification.

Step 302: determining whether an emotion classification with a highest confidence in the audio emotion recognition result is the same as an emotion classification with a highest confidence in the text emotion recognition result. If a result of the determining is yes, step 303 is performed; otherwise step 304 is performed.

Step 303: using the emotion classification having a highest confidence in the audio emotion recognition result or the emotion classification having a highest confidence in the text emotion recognition result as the emotion recognition result.

For example, when the audio emotion recognition result includes a satisfaction classification (confidence is a1) and a calm classification (confidence is a2), and the text emotion recognition result includes only the satisfaction classification (confidence is b1), and when a1>a2, the satisfaction classification is used as a final emotion recognition result.

Step 304: comparing confidence of the emotion classification having a highest confidence in the audio emotion recognition result with confidence of the emotion classification having a highest confidence in the text emotion recognition result.

In an embodiment of the present invention, it is considered that in an actual application scenario, according to a specific algorithm of emotion recognition and a limitation of a type and a content of the user voice message, one of the audio emotion recognition result and the text emotion recognition result may be selected as primarily considered emotion recognition result output, and the other is used as secondarily considered emotion recognition result output, and then factors such as the confidence and the emotion intensity level are used to comprehensively determine the final emotion recognition result. It should be understood that, whether the audio emotion recognition result or the text emotion recognition result is selected as the primarily considered emotion recognition result output may be determined according to an actual scenario. However, whether the audio emotion recognition result or the text emotion recognition result is selected as the primarily considered emotion recognition result output is not limited in the present invention.

In an embodiment of the present invention, the audio emotion recognition result is used as the primarily considered emotion recognition result output, and the text emotion recognition result is used as the secondarily considered emotion recognition result output. In this case, if the confidence of the emotion classification having a highest confidence in the audio emotion recognition result is greater than the confidence of the emotion classification having a highest confidence in the text emotion recognition result, step 305 is performed; if the confidence of the emotion classification having a highest confidence in the audio emotion recognition result is less than the confidence of the emotion classification having a highest confidence in the text emotion recognition result, step 306 is performed; and if the confidence of the emotion classification having a highest confidence in the audio emotion recognition result is equal to the confidence of the emotion classification having a highest confidence in the text emotion recognition result, step 309 is performed.

Step 305: using the emotion classification having a highest confidence in the audio emotion recognition result as the emotion recognition result.

The audio emotion recognition result is selected as the primarily considered emotion recognition result output, the emotion classification in the audio emotion recognition result should be prioritized; besides, the confidence of the emotion classification having a highest confidence in the audio emotion recognition result is greater than the confidence of the emotion classification having a highest confidence in the text emotion recognition result. Therefore, an emotion classification with highest reliability in the primarily considered audio emotion recognition results can be selected as the emotion recognition result. For example, when the audio emotion recognition result includes a satisfaction classification (confidence is a1) and a calm classification (confidence is a2), and the text emotion recognition result includes only the satisfaction classification (confidence is b1), and when a1>a2 and a1>b1, the satisfaction classification is used as a final emotion recognition result.

Step 306: determining whether the audio emotion recognition result includes the emotion classification having a highest confidence in the text emotion recognition result. If a result of the determining is yes, step 307 is performed; otherwise step 309 is performed.

For example, when the audio emotion recognition result includes a satisfaction classification (confidence is a1) and a calm classification (confidence is a2), the text emotion recognition result includes only the calm classification (confidence is b1), and a1>a2 and a1<b1, it needs to determine whether the audio emotion recognition result includes the calm classification having a highest confidence in the text emotion recognition result.

Step 307: further determining whether an emotion intensity level of the emotion classification having a highest confidence in the text emotion recognition result included in the audio emotion recognition result is greater than a first intensity threshold. If a result of the further determining is yes, step 308 is performed; otherwise step 309 is performed.

Step 308: using the emotion classification having a highest confidence in the text emotion recognition result as the emotion recognition result.

The performing of step 308 means that the emotion classification having a highest confidence in the text emotion recognition result is not only highly reliable, but also has an obvious tendency. Therefore, the emotion classification having a highest confidence in the text emotion recognition result can be used as the emotion recognition result.

Step 309: using the emotion classification having a highest confidence in the audio emotion recognition result as the emotion recognition result, or collectively using the emotion classification having a highest confidence in the audio emotion recognition result and the emotion classification having a highest confidence in the text emotion recognition result as the emotion recognition result.

When the confidence of the emotion classification having a highest confidence in the audio emotion recognition result is equal to the confidence of the emotion classification having a highest confidence in the text emotion recognition result, or the audio emotion recognition result does not include the emotion classification having a highest confidence in the text emotion recognition result, or even if the audio emotion recognition result includes the emotion classification having a highest confidence in the text emotion recognition result, but the emotion intensity level of the emotion classification is not high enough, it is indicated that no unified emotion classification can be output, according to the audio emotion recognition result and the text emotion recognition result in this case, as the final emotion recognition result. In this case, in an embodiment of the present invention, considering that the audio emotion recognition result is selected as the primarily considered emotion recognition result output, the emotion classification having a highest confidence in the audio emotion recognition result is directly used as the emotion recognition result. In another embodiment of the present invention, the audio emotion recognition result and the text emotion recognition result may also be collectively used as the emotion recognition result, and the corresponding emotional intention information is determined in a subsequent process in combination with the emotion recognition result and the basic intention information of a previous user voice message and/or a subsequent user voice message.

Figure 4:
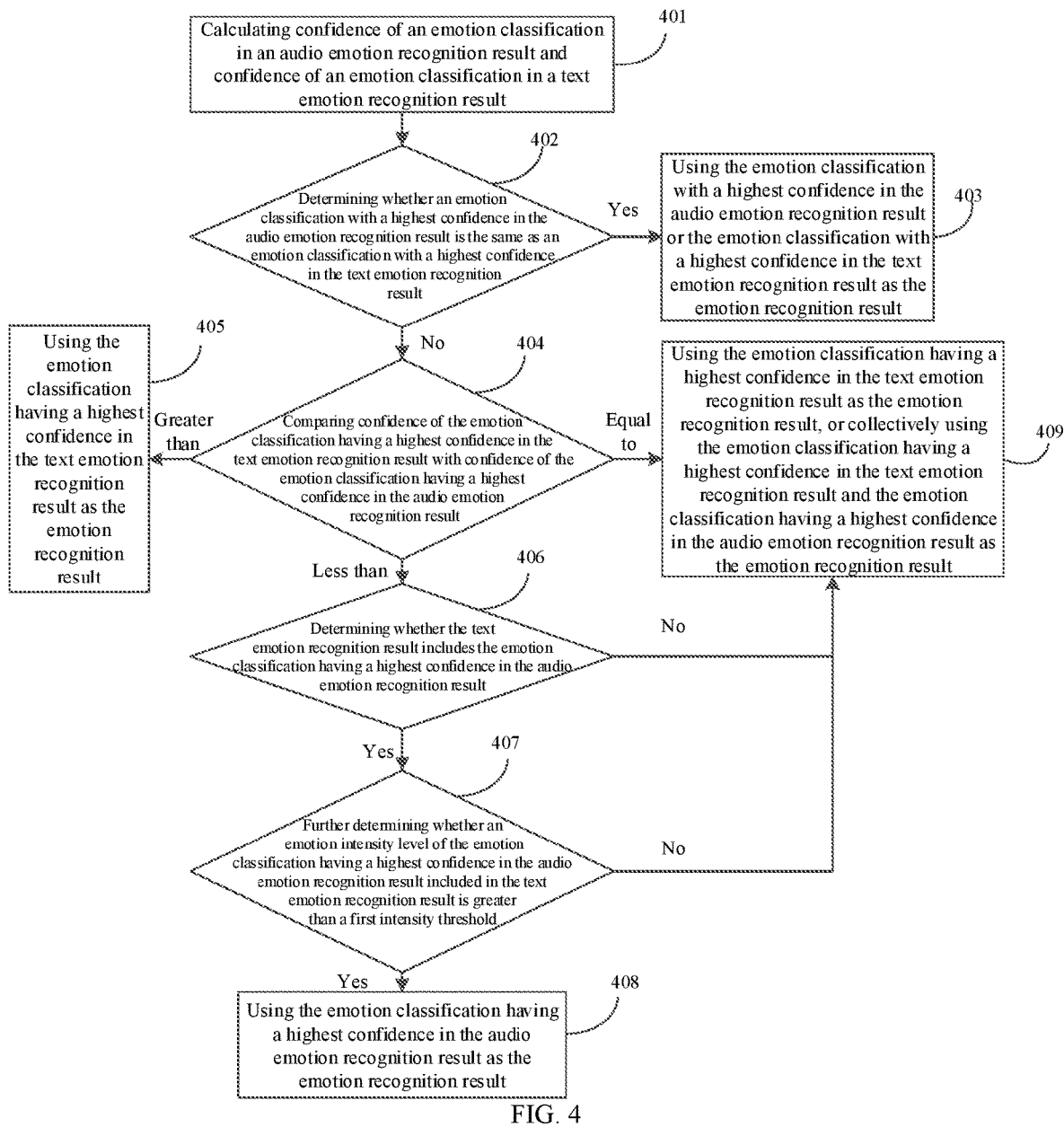
FIG. 4 is a schematic flow diagram of determining an emotion recognition result in an intelligent interactive method provided in another embodiment of the present invention.

FIG. 4 is a schematic flow diagram of determining an emotion recognition result in an intelligent interactive method provided in another embodiment of the present invention. Different from the embodiment shown in FIG. 3, the embodiment shown in FIG. 4 selects a text emotion recognition result as a primarily considered emotion recognition result, and an audio emotion recognition result is used as a secondarily considered emotion recognition result output. It should be understood that, a process of determining the emotion recognition result in this case may be similar to the process logic shown in FIG. 3, and only the primarily considered emotion recognition result output is changed to the text emotion recognition result. Specific steps are as follows and repeated logical description will not be described again.

Step 401: calculating confidence of an emotion classification in an audio emotion recognition result and confidence of an emotion classification in a text emotion recognition result.

Step 402: determining whether an emotion classification with a highest confidence in the audio emotion recognition result is the same as an emotion classification with a highest confidence in the text emotion recognition result. If a result of the determining is yes, step 403 is performed; otherwise step 404 is performed.

Step 403: using the emotion classification with a highest confidence in the audio emotion recognition result or the emotion classification with a highest confidence in the text emotion recognition result as the emotion recognition result.

Step 404: comparing confidence of the emotion classification having a highest confidence in the text emotion recognition result with confidence of the emotion classification having a highest confidence in the audio emotion recognition result.

If the confidence of the emotion classification having a highest confidence in the text emotion recognition result is greater than the confidence of the emotion classification having a highest confidence in the audio emotion recognition result, step 405 is performed. If the confidence of the emotion classification having a highest confidence in the text emotion recognition result is less than the confidence of the emotion classification having a highest confidence in the audio emotion recognition result, step 406 is performed. If the confidence of the emotion classification having a highest confidence in the text emotion recognition result is equal to the confidence of the emotion classification having a highest confidence in the audio emotion recognition result, step 409 is performed.

Step 405: using the emotion classification having a highest confidence in the text emotion recognition result as the emotion recognition result.

Step 406: determining whether the text emotion recognition result includes the emotion classification having a highest confidence in the audio emotion recognition result. If a result of the determining is yes, step 407 is performed; otherwise step 409 is performed.

Step 407: further determining whether an emotion intensity level of the emotion classification having a highest confidence in the audio emotion recognition result included in the text emotion recognition result is greater than a first intensity threshold. If a result of the further determining is yes, step 408 is performed; otherwise step 409 is performed.

Step 408: using the emotion classification having a highest confidence in the audio emotion recognition result as the emotion recognition result.

Step 409: using the emotion classification having a highest confidence in the text emotion recognition result as the emotion recognition result, or collectively using the emotion classification having a highest confidence in the text emotion recognition result and the emotion classification having a highest confidence in the audio emotion recognition result as the emotion recognition result.

It should be understood that, although the embodiments in FIG. 3 and FIG. 4 provide examples of determining the emotion recognition result, a process of collectively determining the emotion recognition result according to the audio emotion recognition result and the text emotion recognition result may be implemented in another manner depending on different specific forms of the audio emotion recognition result and the text emotion recognition result, which is not limited to the embodiments shown in FIG. 3 and FIG. 4, and the present invention is not limited thereto.

In an embodiment of the present invention, the audio emotion recognition result and the text emotion recognition result respectively correspond to a coordinate point in the multi-dimensional emotion space. In this case, coordinate values of the coordinate points of the audio emotion recognition result and the text emotion recognition result in the multi-dimensional emotion space are subjected to weighted averaging processing, and coordinate points obtained by the weighted average processing are used as the emotion recognition result. For example, when a PAD three-dimensional emotion model is used, the audio emotion recognition result is represented as (p1, a1, d1), and the text emotion recognition result is represented as (p2, a2, d2), then a final emotion recognition result may be represented as ((P1+p2)/2, (a1+1.3*a2)/2, (d1+0.8*d2)/2), where 1.3 and 0.8 are weight coefficients. The use of a non-discrete dimensional emotion model makes it easier to calculate the final emotion recognition result in a quantitative manner. However, it should be understood that the combination of the two is not limited to the foregoing weighted average processing, and a specific manner of determining the emotion recognition result used when the audio emotion recognition result and the text emotion recognition result respectively correspond to one coordinate point in the multi-dimensional emotion space is not limited in the present invention.

Figure 5:
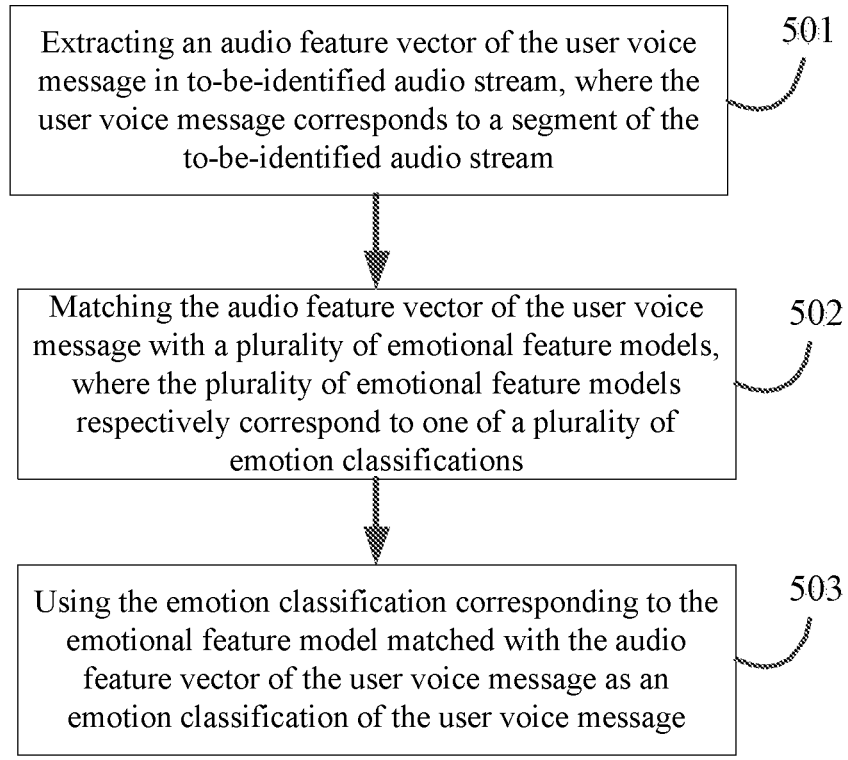
FIG. 5 is a schematic flow diagram of obtaining an audio emotion recognition result according to audio data of a user voice message in an intelligent interactive method provided in an embodiment of the present invention.

FIG. 5 is a schematic flow diagram of obtaining an audio emotion recognition result according to audio data of a user voice message in an intelligent interactive method provided in an embodiment of the present invention. As shown in FIG. 5, a process of the obtaining an audio emotion recognition result according to audio data of a user voice message includes:

Step 501: extracting an audio feature vector of the user voice message in to-be-identified audio stream, where the user voice message corresponds to a segment of the to-be-identified audio stream.

The audio feature vector includes a value of at least one audio feature in at least one vector direction. In this way, a multi-dimensional vector space is used to represent all audio features. In the vector space, the direction and value of the audio feature vector can be considered as a summation of values of many audio features in different vector directions within the vector space. A value of each audio feature in a vector direction may be considered as a component of the audio feature vector. User voice messages including different emotions necessarily have different audio features. The present invention exactly utilizes correspondences between different emotions and different audio features to identify an emotion of the user voice message. Specifically, the audio feature may include one or more of the following features: an energy feature, a speech frame number feature, a pitch frequency feature, a formant feature, a harmonic to noise ratio feature, and a mel-frequency cepstral coefficient feature. In an embodiment of the present invention, the following vector directions may be set in the vector space: a proportion value, an average value, a maximum value, a median value, and a standard deviation.

The energy feature refers to a power spectrum feature of the user voice message, which can be obtained by summing power spectrum. The calculation formula may be:

$$E(k) = \sum_{j=0}^{N-1} P(k, j),$$

where E represents the value of the energy feature, k represents the number of a frame, j represents the number of the frequency bin, N is the frame length, and P represents the value of the power spectrum. In an embodiment of the present invention, the energy feature may include a first-order difference of short-term energy, and/or an energy level with a frequency below a preset frequency. The formula for calculating the first-order difference of short-time energy may be as follows:

$$\Delta E(k)=(-2*E(k-2)-E(k-1)+E(k+1)+2*E(k+2))/3;$$

The energy level with a frequency below a preset frequency may be measured by the proportional value. For example, the formula for calculating the proportional value of the energy with a frequency below 500 Hz to the total energy may be as follows:

$$p1 = \frac{\sum_{k=k1}^{k2} \sum_{j=1}^{j_{500}} P(k, j)}{\sum_{k=k1}^{k2} \sum_{j=1}^{N/2-1} P(k, j)},$$

where $j_{500}$ is the frequency bin number corresponding to 500 Hz, k1 is the number of a voice start frame of a to-be-identified user voice message, and k2 is the number of a voice end frame of the to-be-identified user voice message.

The speech frame number feature refers to a quantity of speech frames in the user voice message, and the quantity of the speech frames may also be measured through the proportion value. For example, if quantities of speech frames and non-speech frames in the user voice message are n1 and n2, respectively, a proportion value of the quantity of the speech frames to that of the non-speech frames is: p2=n1/n2 and a proportion value of the quantity of the speech frames to total quantity of frames is: p3=n1/(n1+n2).

The pitch frequency feature may be extracted by using an algorithm based on an autocorrelation function of an error signal of a linear prediction coding (LPC). The pitch frequency feature may include a pitch frequency and/or a first-order difference of a pitch frequency. An algorithm process of the pitch frequency may be as follows: firstly, a linear prediction coefficient of the speech frame x(k) is calculated and a linear prediction estimation signal $\bar{x}(k)$ is calculated; secondly, the autocorrelation function c1 of the error signal is calculated by c1=xcorr(x(k)−$\bar{x}$(k)); then, within an offset range corresponding to pitch frequency of 80 Hz to 500 Hz, a maximum value of the autocorrelation function is found and corresponding offset Δh is recorded. The calculation formula of the pitch frequency F0 is: F0=Fs/Δh, where Fs is the sampling frequency.

The formant feature may be extracted by using a polynomial root-finding algorithm based on a linear prediction, which may include a first formant, a second formant, a third formant, and a first order difference of the three formants. The harmonic to noise ratio (HNR) feature may be extracted by using an algorithm based on independent component analysis (ICA). The mel-frequency cepstral coefficient (MFCC) feature may include 1-12 order mel-frequency cepstral coefficients, which may be obtained by using a general mel-frequency cepstral coefficient calculation process, and will not be described herein.

It should be understood that audio feature vectors are specifically extracted may be determined according to requirements of an actual scenario. The type, number, and vector direction of the audio feature corresponding to the extracted audio feature vector is not limited in the present invention. However, in an embodiment of the present invention, in order to obtain an optimal emotion recognition effect, the foregoing energy feature, speech frame number feature, pitch frequency feature, formant feature, harmonic to noise ratio feature, and mel-frequency cepstral coefficient feature may be simultaneously extracted. For example, when the above six audio features are simultaneously extracted, the extracted audio feature vector may include 173 components as shown in Table 1 below. When the audio feature vector in Table 1 below and a Gaussian model (GMM) are used as an emotional feature model to perform voice emotion recognition on the Casia Chinese Emotional Corpus, accuracy may reach 74% to 80%.

TABLE 1

| Component number | Component name |
|---|---|
| 1-5 | Average values, maximum values, minimum values, median values, and standard deviations of a first-order difference of a short-term energy |
| 6 | Proportions of energies with frequency band below 500 Hz to a total energy |
| 7-8 | Proportions of a quantity of speech frames to a quantity of non-speech frames, and/or proportions of a quantity of speech frames to a total quantity of frames |
| 9-13 | Average values, maximum values, minimum values, median values, and standard deviations of a pitch frequency |
| 14-18 | Average values, maximum values, minimum values median values, and standard deviations of a first-order difference of a pitch frequency |
| 19-33 | Respective average values, respective maximum values, respective minimum values, respective median values, and respective standard deviations of the first formant, the second formant, and the third formant |
| 34-48 | Respective average values, respective maximum values, respective minimum values, respective median values, and respective standard deviations of a first-order difference of the first formant, the second formant, and the third formant |
| 49-53 | Average values, maximum values, minimum values, median values, and standard deviations of a harmonic to noise ratio |
| 54-113 | Average values, maximum values, minimum values, median values, and standard deviations of the 1-12 order mel-frequency cepstral coefficient |
| 114-173 | Average values, maximum values, minimum values, median values, and standard deviations of a first-order difference of the 1-12 order mel-frequency cepstral coefficient |

In an embodiment of the present invention, the to-be-identified audio stream may be a customer service interactive audio stream, and the user voice message corresponds to a single user input voice segment or a single customer service input voice segment in the to-be-identified audio stream. Since the customer interactive process is often in a questioning and answering form, the single user input voice segment may correspond to single questioning or answering of a user during a single interactive process, and the single customer service input voice segment may correspond to single questioning or answering of customer service personnel during a single interactive process. It is generally believed that the user or the customer service personnel can express emotions completely in single questioning or answering. Therefore, when the single user input voice segment or the single customer service input voice segment is used as a unit of emotion recognition, integrity of the emotion recognition can be ensured, and real-time performance of the emotion recognition during a customer service interactive process can also be ensured.

Step 502: matching the audio feature vector of the user voice message with a plurality of emotional feature models, where the plurality of emotional feature models respectively correspond to one of a plurality of emotion classifications.

Figure 6:
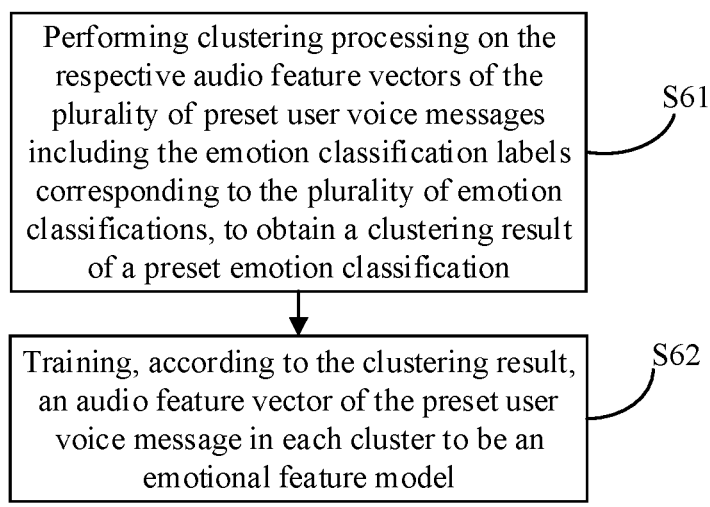
FIG. 6 is a schematic flow diagram of establishing an emotional feature model in an intelligent interactive method provided in an embodiment of the present invention.

These emotional feature models may be established by pre-learning respective audio feature vectors of a plurality of preset user voice messages including emotion classification labels corresponding to the plurality of emotion classifications, which is equivalent to establishing correspondences between the emotional feature models and the emotion classifications. Each emotional feature model may correspond to one emotion classification. As shown in FIG. 6, the establishment of a pre-learning process of the emotional feature model may include: performing clustering processing on the respective audio feature vectors of the plurality of preset user voice messages including the emotion classification labels corresponding to the plurality of emotion classifications, to obtain a clustering result of a preset emotion classification (S61); and then training, according to the clustering result, an audio feature vector of the preset user voice message in each cluster to be an emotional feature model (S62). Based on these emotional feature models, an emotional feature model corresponding to the current user voice message may be obtained through a matching process based on the audio feature vector, and then the corresponding emotion classification is obtained.

In an embodiment of the present invention, the emotional feature models may be a Gaussian mixture model (GMM) (a degree of mixing can be 5). In this case, the K-means algorithm can be used to cluster emotional feature vectors of voice samples of a same emotion classification, and an initial value of a parameter of the Gaussian mixture model is calculated according to the clustering result (a quantity of iterations can be 50). Then, the E-M algorithm is used to train Gaussian mixture models corresponding to various emotion classifications (a quantity of iterations is 200). In a process of matching emotion classifications by using these Gaussian mixture models, a likelihood probability between the audio feature vector of the current user voice message and each of a plurality of emotional feature models may be calculated, and then a matched emotional feature model is determined by measuring the likelihood probability, for example, an emotional feature model, whose likelihood probability is greater than a preset threshold, having a largest likelihood probability is used as the matched emotional feature model.

It should be understood that, although the emotional feature model may be a Gaussian mixture model in the foregoing description, the emotional feature model may also be implemented in another form, such as a support vector machine (SVM) model, a K nearest neighbor classification algorithm (KNN) model, a Markov model (HMM), and a neural network (ANN) model.

In an embodiment of the present invention, the plurality of emotion classifications may include: a satisfaction classification, a calm classification, and an irritation classification, in response to a possible emotional state of a user in the customer service interactive scenario. In another embodiment, the plurality of emotion classifications may include: a satisfaction classification, a calm classification, an irritation classification, and an anger classification, in response to a possible emotional state of customer service personnel in the customer service interactive scenario. That is, when the to-be-identified audio stream is an audio stream of interaction between a user and customer service personnel in the customer service interactive scenario, if the current user voice message corresponds to a single customer service personnel input voice segment, the plurality of emotion classifications may include: a satisfaction classification, a calm classification, and an irritation classification; if the current user voice message corresponds to a single user input voice segment, the plurality of emotion classifications may include: a satisfaction classification, a calm classification, an irritation classification, and an anger classification. The foregoing emotion classification of the user and customer service personnel may be more simply applied to a call center system, reducing calculation and meeting emotion recognition needs of the call center system. However, it should be understood that types and quantities of these emotion classifications may be adjusted according to actual application scenario requirements.

Step 503: using the emotion classification corresponding to the emotional feature model matched with the audio feature vector of the user voice message as an emotion classification of the user voice message.

As described above, since there is a correspondence between the emotional feature model and the emotion classification, when the matched emotional feature model is determined according to the matching process of step 502, the emotion classification corresponding to the matched emotional feature model is the identified emotion classification. For example, when the emotional feature models are Gaussian mixture models, the matching process may be implemented by measuring the likelihood probability between the audio feature vector of the current user voice message and each of the plurality of emotional feature models, and then an emotion classification corresponding to the emotional feature model, whose likelihood probability is greater than a preset threshold, having a largest likelihood probability is used as the emotion classification of the user voice message.

It can be seen that, according to the voice emotion recognition method provided in this embodiment of the present invention, the audio feature vector of the user voice message in the to-be-identified audio stream is extracted, and the extracted audio feature vector is used to match with the pre-established emotional feature model, thereby realizing real-time emotion recognition of the user voice message.

It should also be understood that, the emotion classification identified by the voice emotion recognition method provided in this embodiment of the present invention may further implement more flexible secondary applications in accordance with specific scenario requirements. In an embodiment of the present invention, the currently identified emotion classification of the user voice message may be displayed in real time, and a specific real-time display manner may be adjusted according to actual scenario requirements. For example, different emotions may be represented by different colors of a signal light, so that the change of the color of the signal light may remind customer service personnel and quality inspection personnel about an emotional state of a current call in real time. In another embodiment, the identified emotion classification of the user voice message within a preset time period may also be counted. For example, audio numbers of call recording, timestamps of start points and end points of user voice messages, and emotion recognition results are recorded, an emotional recognition database is finally formed, and moreover, quantities and probability of occurrence of various emotions within a period of time are counted, and a graph or a table is prepared for the reference basis for an enterprise to evaluate service quality of customer service personnel within a period of time. In another embodiment, emotional response information corresponding to the identified emotion classification of the user voice message may also be sent in real time, which may be applicable to a machine customer service scenario without manual attendance. For example, when it is recognized in real time that the user is already in an "angry" state during the current call, the user is responded automatically with comforting utterance corresponding to the "angry" state, so as to calm the user's mood and achieve purpose of continuing communication. The correspondence between the emotion classification and the emotional response information may be pre-established through a pre-learning process.

In an embodiment of the present invention, before extracting the audio feature vector of the user voice message in the to-be-identified audio stream, the user voice message needs to be first extracted from the to-be-identified audio stream, so that emotion recognition is performed in a form of user voice messages subsequently, and the extraction process may be performed in real time.

Figure 7:
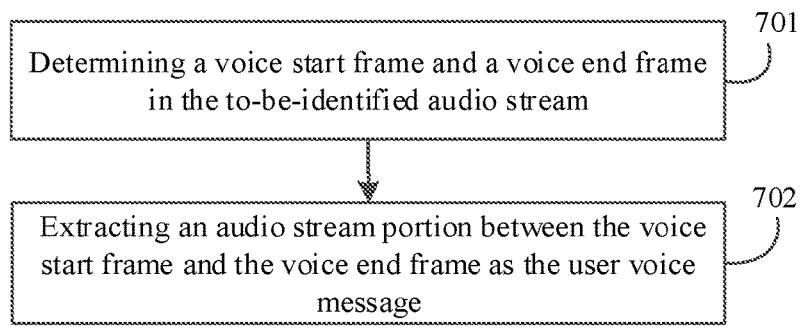
FIG. 7 is a schematic flow diagram of extracting a user voice message in an intelligent interactive method provided in an embodiment of the present invention.

FIG. 7 is a schematic flow diagram of extracting a user voice message in an intelligent interactive method provided in an embodiment of the present invention. As shown in FIG. 7, a method of extracting the user voice message includes:

Step 701: determining a voice start frame and a voice end frame in the to-be-identified audio stream.

The voice start frame is a start frame of a user voice message, and the voice end frame is an end frame of a user voice message. When the voice start frame and the voice end frame are determined, a portion between the voice start frame and the voice end frame is the user voice message to be extracted.

Step 702: extracting an audio stream portion between the voice start frame and the voice end frame as the user voice message.

Figure 8:
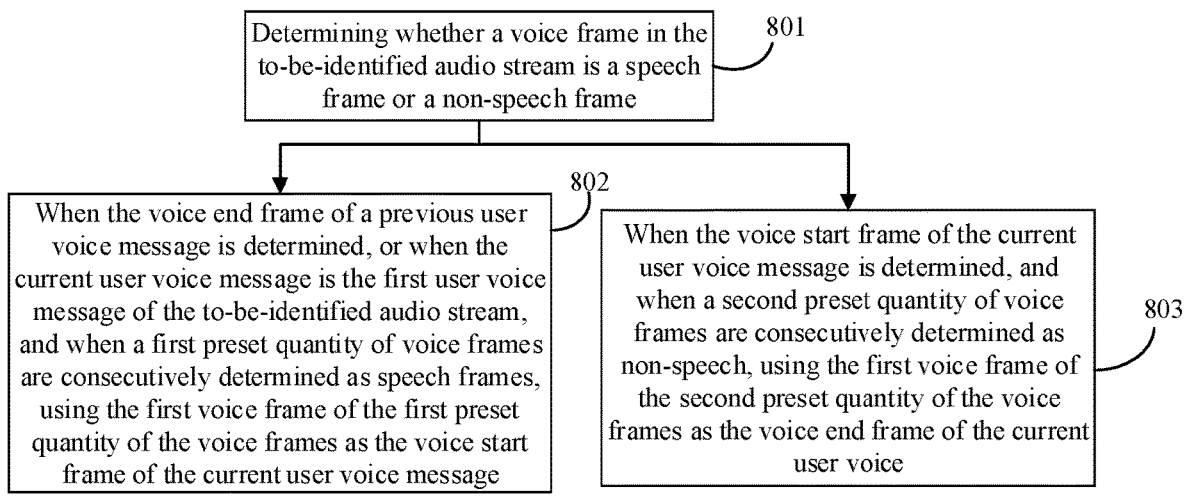
FIG. 8 is a schematic flow diagram of determining a voice start frame and a voice end frame in an intelligent interactive method provided in an embodiment of the present invention.

In an embodiment of the present invention, as shown in FIG. 8, the following steps are specifically used to determine the voice start frame and the voice end frame in the to-be-identified audio stream.

Step 801: determining whether a voice frame in the to-be-identified audio stream is a speech frame or a non-speech frame.

Figure 9:
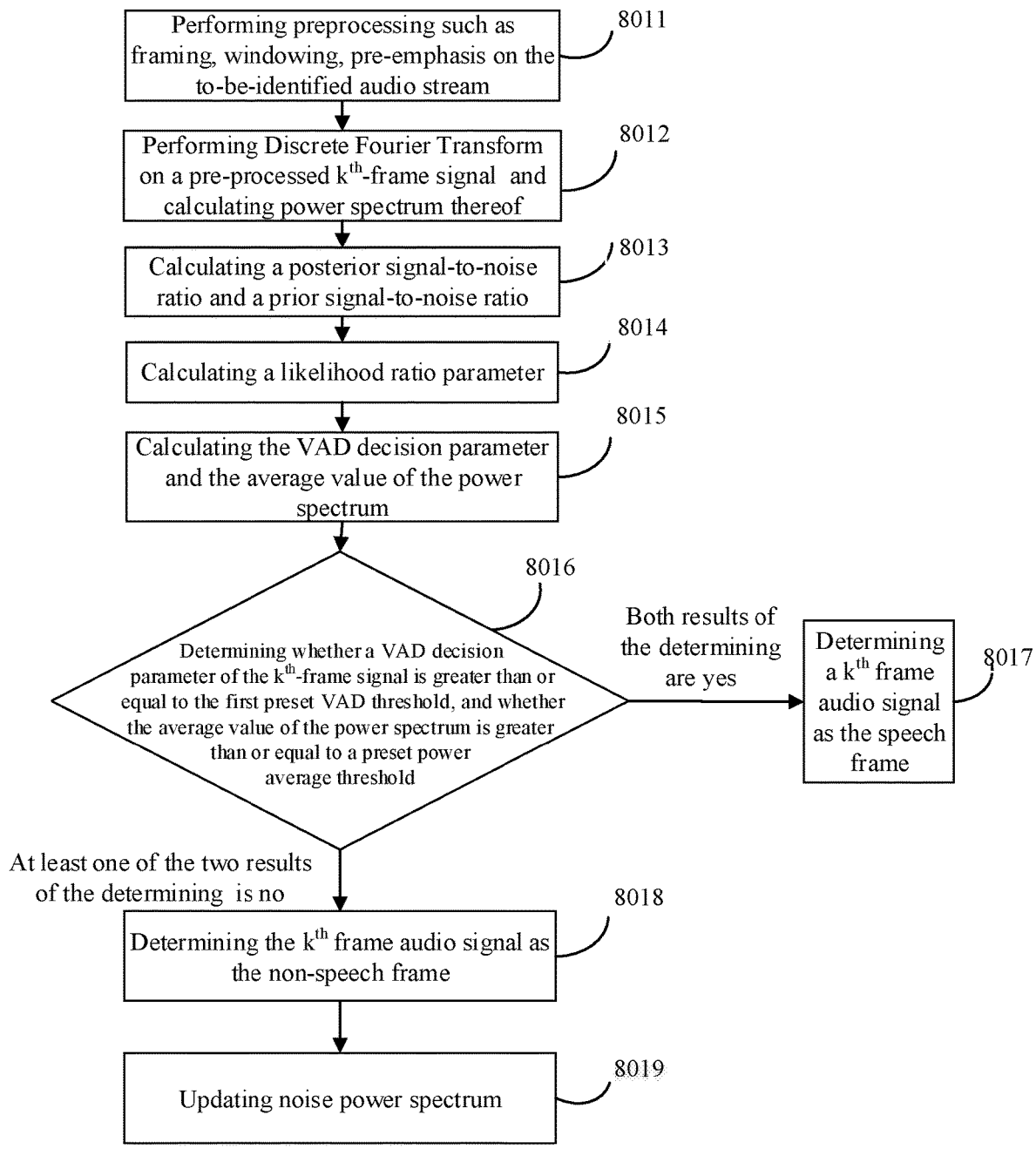
FIG. 9 is a schematic flow diagram of detecting a speech frame or a non-speech frame in an intelligent interactive method provided in an embodiment of the present invention.

In an embodiment of the present invention, the process of determining a speech frame or a non-speech frame may be implemented based on determining of a voice activity detection (VAD) decision parameter and an average value of power spectrum. As shown in FIG. 9, specific steps are as follows.

Step 8011: performing preprocessing such as framing, windowing, pre-emphasis on the to-be-identified audio stream. The window function may be a Hamming window, and the pre-emphasis coefficient may be 0.97. A signal of a $k^{th}$-frame after preprocessing is recorded as $x(k)=[x(k*N), x(k*N+1), \ldots, x(k*N+N-1)]$, N is a frame length, for example, can be set to 256. However, it should be understood that, whether a pre-processing process needs or not, and what pre-processing processes are needed may be determined according to actual scenario requirements, and the present invention is not limited thereto.

Step 8012: performing Discrete Fourier Transform (DFT) on a pre-processed $k^{th}$-frame signal $x(k)$ and calculating power spectrum thereof, where a DFT length is set to be the same as the frame length:

$$P(k,j)=|FFT(x(k))|^2, j=0,1,\ldots,N-1;$$

j herein represents the number of the frequency bin.

Step 8013: calculating a posterior signal-to-noise ratio γ and a prior signal-to-noise ratio ξ.

$$\gamma(k, j) = \min\left(\frac{P(k, j)}{\lambda(k, j)}, 0.0032\right);$$

$$\xi(k, j) = \alpha\xi(k-1, j) + (1-\alpha)\max(\gamma(k, j) - 1, 0),$$

where the coefficient herein is $\alpha=0.98$; λ is a background noise power spectrum, power spectrum of first 5 to 10 frames may be detected and an average value thereof is calculated and used as an initial value; min( ) and max( ) mean to get a minimum function and a maximum function respectively; and the priori signal-to-noise ratio $\xi(k,j)$ can be initialized to 0.98.

Step 8014: calculating a likelihood ratio parameter η:

$$\eta(k) = \exp\left(\frac{1}{N}\sum_{j=0}^{N-1}\left(\gamma(k, j)\frac{\xi(k, j)}{1+\xi(k, j)} - \log(1+\xi(k, j))\right)\right).$$

Step 8015: calculating the VAD decision parameter Γ and the average value ρ of the power spectrum, $$\Gamma(k) = \frac{0.2 + 0.9*\Gamma(k-1)}{0.8 + 0.1*\Gamma(k-1)} * \eta(k); \rho(k) = \frac{1}{N^2}\sum_{j=0}^{N-1}P(k, j).$$

The VAD decision parameter can be initialized to 1.

Step 8016: determining whether a VAD decision parameter $\Gamma(k)$ of the $k^{th}$-frame signal is greater than or equal to the first preset VAD threshold, and whether $\rho(k)$ is greater than or equal to a preset power average threshold. In an embodiment of the present invention, the first preset VAD threshold may be 5, and the preset power average threshold may be 0.01.

Step 8017: If both results of the determining in step 8016 are yes, a $k^{th}$ frame audio signal is determined as the speech frame.

Step 8018: If at least one of the two results of the determining in step 8016 is no, the $k^{th}$ frame audio signal is determined as the non-speech frame, and step 8019 is performed.

Step 8019: updating noise power spectrum λ according to the following formula:

$$\lambda(k+1,j)=\beta*\lambda(k,j)+(1-\beta)*P(k,j)$$

where the coefficient β is a smoothing coefficient, and the value can be set to 0.98.

It can be seen that the speech frame and the non-speech frame in the to-be-identified audio stream may be monitored in real time by continuously repeating the method steps as shown in FIG. 5. Recognition results of these speech frames and non-speech frames are the basis for subsequent recognition of a voice start frame and a voice end frame.

Step 802: when the voice end frame of a previous user voice message is determined, or when the current user voice message is the first user voice message of the to-be-identified audio stream, and when a first preset quantity of voice frames are consecutively determined as speech frames, using the first voice frame of the first preset quantity of the voice frames as the voice start frame of the current user voice message.

In an embodiment of the present invention, two endpoint flags flag_start and flag_end may be first set to represent detected state variables of the voice start frame and the voice end frame, respectively, and true and false represent occurrence and non-occurrence, respectively. When flag_end=true, it indicates that the end frame of the previous user voice message has been determined, and in this case, a start frame of a next user voice message is started to be detected. When VAD decision parameter values of continuous 30-frame signals are greater than a second preset threshold, it indicates that the 30 frames belong to one user voice message, and in this case, the first voice frame in the 30 frames is used as the voice start frame, Flag_start=true; otherwise flag_start=false.

Step 803: when the voice start frame of the current user voice message is determined, and when a second preset quantity of voice frames are consecutively determined as non-speech frames, which indicates that the second preset quantity of voice frames do not belong to the user voice message, then using the first voice frame of the second preset quantity of the voice frames as the voice end frame of the current user voice message.

Specifically, the foregoing example is still used. When flag_start=true, it indicates that it has been in one user voice message and the voice start frame of the user voice message has been determined. In this case, the end frame of the current user voice message is started to be detected. When the VAD decision parameter values of the continuous 30-frame signals are less than a third preset threshold, it is determined that the current user voice message ends, flag_end=true, and correspondingly the first frame of the 30 frames is the voice end frame; otherwise, flag_end=false.

In an embodiment of the present invention, in order to further improve judgment accuracy of the voice start frame and the voice end frame, and avoid false judgment, the second preset threshold and the third preset threshold may be set to be greater than the first preset threshold in the foregoing speech frame and non-speech frame recognition process, for example, the second preset threshold can be set to 40, and the third preset threshold can be set to 20.

It can be seen that by using the method steps shown in FIG. 8, the voice start frame and the voice end frame in the to-be-identified audio stream may be determined, and the user voice message between the voice start frame and the voice end frame may be extracted for emotion recognition.

It should be understood that, although some calculation coefficients, initial values of parameters, and some judgment thresholds are introduced in the foregoing description of the embodiments of FIG. 8 and FIG. 9, the calculation coefficients, the initial values of the parameters, and the judgment thresholds may be adjusted according to an actual application scenario. Specific values of the calculation coefficients, the initial values of the parameters, and the determination threshold are not limited in the present invention.

Figure 10:
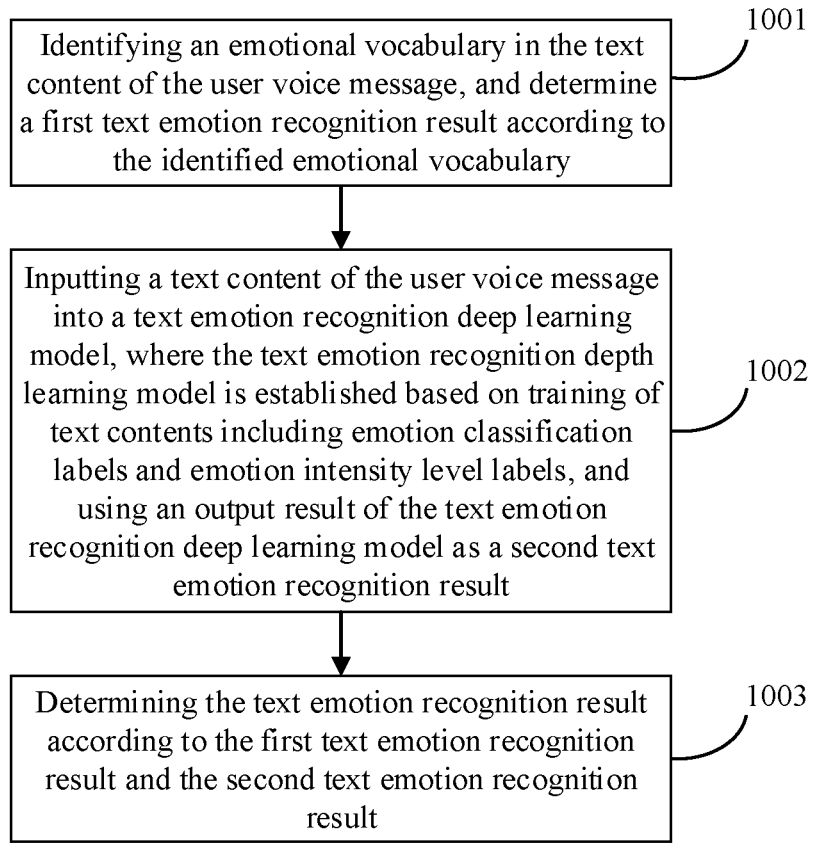
FIG. 10 is a schematic flow diagram of obtaining a text emotion recognition result according to a text content of a user voice message in an intelligent interactive method provided in an embodiment of the present invention.

FIG. 10 is a schematic flow diagram of obtaining a text emotion recognition result according to a text content of a user voice message in an intelligent interactive method provided in an embodiment of the present invention. As shown in FIG. 10, a process of the obtaining a text emotion recognition result according to a text content of a user voice message includes the following steps:

Step 1001: identifying an emotional vocabulary in the text content of the user voice message, and determine a first text emotion recognition result according to the identified emotional vocabulary.

A correspondence between the emotional vocabulary and the first text emotion recognition result may be established through a pre-learning process, each emotional vocabulary has a corresponding emotion classification and emotion intensity level, and emotion classifications of all text contents of the user voice message and emotion intensity levels of the emotion classifications are obtained according to a preset statistical algorithm and correspondence. For example, when a text content of the user voice message includes the following emotional vocabulary: "Thank you" (corresponding to a satisfaction emotion classification, and a moderate emotion intensity level), "Very good" (corresponding to a satisfaction emotion classification, and a high emotion intensity level), "Excellent" (corresponding to a satisfaction emotion classification, and a high emotion intensity level) and the like, the corresponding first text emotion recognition result may be a satisfaction emotion classification, and the emotion intensity level of the satisfaction emotion classification is high.

Step 1002: inputting a text content of the user voice message into a text emotion recognition deep learning model, where the text emotion recognition depth learning model is established based on training of text contents including emotion classification labels and emotion intensity level labels, and using an output result of the text emotion recognition deep learning model as a second text emotion recognition result.

Step 1003: determining the text emotion recognition result according to the first text emotion recognition result and the second text emotion recognition result.

It should be understood that, the first text emotion recognition result and the second text emotion recognition result may be represented in a plurality of manners. In an embodiment of the present invention, an emotion recognition result may be represented in a discrete emotion classification manner. In this case, the first text emotion recognition result and the second text emotion recognition result may include one or more of a plurality of emotion classifications, respectively, and each emotion classification may include a plurality of emotion intensity levels. In another embodiment of the present invention, an emotion recognition result may be represented in a manner of a non-discrete dimensional emotion model. The first text emotion recognition result and the second text emotion recognition result respectively correspond to one coordinate point in a multi-dimensional emotion space, and each dimension in the multi-dimensional emotion space corresponds to a psychologically defined sentiment factor. The representation manners of discrete emotion classification and non-discrete dimensional emotion model are described above and will not be repeated herein. However, it should be understood that, the first text emotion recognition result and the second text emotion recognition result may also be represented in another representation manner, and the representation manner is not specifically limited in the present invention. It should be understood that, in an embodiment of the present invention, a final text emotion recognition result may also be determined according to only one of the first text emotion recognition result and the second text emotion recognition result, which is not limited in the present invention.

Figure 11:
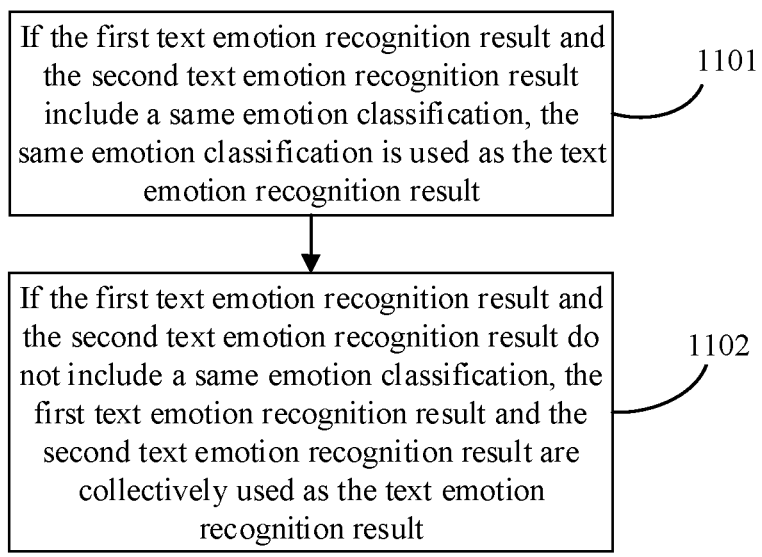
FIG. 11 is a schematic flow diagram of obtaining a text emotion recognition result according to a text content of a user voice message in an intelligent interactive method provided in an embodiment of the present invention.

FIG. 11 is a schematic flow diagram of obtaining a text emotion recognition result according to a text content of a user voice message in an intelligent interactive method provided in an embodiment of the present invention. A user message in this embodiment includes a user voice message. The text emotion recognition result needs to be comprehensively determined according to a first text emotion recognition result and a second text emotion recognition result, and the first text emotion recognition result and the second text emotion recognition result include one or more of a plurality of emotion classifications, respectively. In this case, a method of determining the text emotion recognition result may include the following steps.

Step 1101: If the first text emotion recognition result and the second text emotion recognition result include a same emotion classification, the same emotion classification is used as the text emotion recognition result.

For example, when the first text emotion recognition result includes a satisfaction classification and a calm classification, and the second text emotion recognition result includes only the satisfaction classification, a final text emotion recognition result may be the satisfaction classification.

Step 1102: If the first text emotion recognition result and the second text emotion recognition result do not include a same emotion classification, the first text emotion recognition result and the second text emotion recognition result are collectively used as the text emotion recognition result.

For example, when the first text emotion recognition result includes a satisfaction classification, and the second text emotion recognition result includes only a calm classification, a final text emotion recognition result may be the satisfaction classification and the calm classification. In an embodiment of the present invention, when the final text emotion recognition result includes a plurality of emotion classifications, the corresponding emotional intention information is determined in a subsequent process in combination with the text emotion recognition result and the basic intention information of a previous user voice message and/or a subsequent user voice message.

It should be understood that, although according to step 1102, when the first text emotion recognition result and the second text emotion recognition result do not include a same emotion classification, the first text emotion recognition result and the second text emotion recognition result are collectively used as the text emotion recognition result, a more conservative interactive strategy may also be adopted in another embodiment of the present invention, for example, error information is directly generated or no text emotion recognition result is output, so as to avoid misleading an interactive process. A manner for processing a case in which the first text emotion recognition result and the second text emotion recognition result do not include a same emotion classification is not strictly limited in the present invention.

Figure 12:
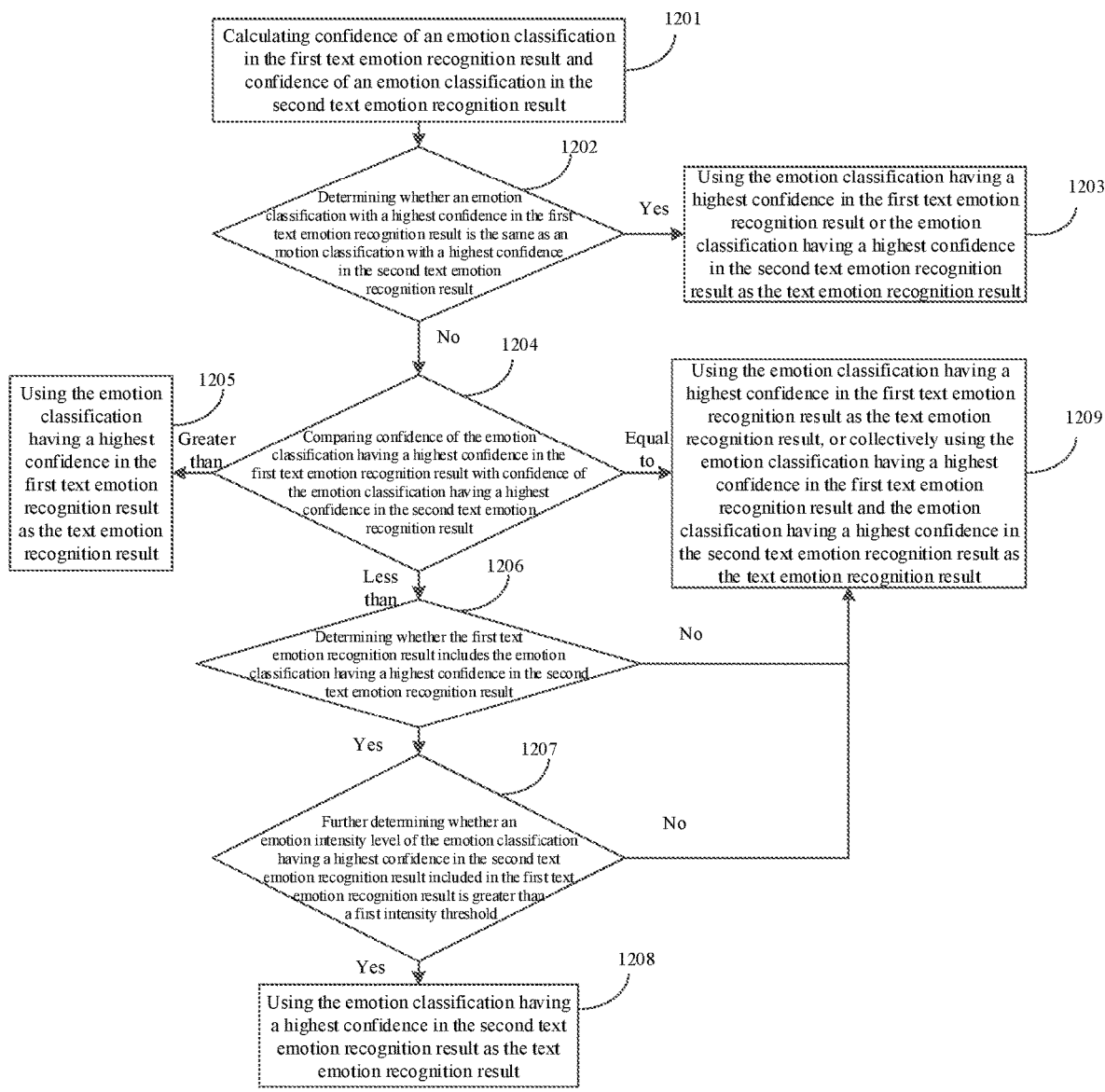
FIG. 12 is a schematic flow diagram of determining a text emotion recognition result in an intelligent interactive method provided in an embodiment of the present invention.

FIG. 12 is a schematic flow diagram of determining a text emotion recognition result in an intelligent interactive method provided in an embodiment of the present invention. A user message in this embodiment also includes a user voice message. The text emotion recognition result also needs to be comprehensively determined according to a first text emotion recognition result and a second text emotion recognition result, and the first text emotion recognition result and the second text emotion recognition result include one or more of a plurality of emotion classifications, respectively. A method of determining the text emotion recognition result may include the following steps.

Step 1201: calculating confidence of an emotion classification in the first text emotion recognition result and confidence of an emotion classification in the second text emotion recognition result.

Statistically, the confidence is also referred to as reliability, confidence level, or confidence coefficient. Since sampling is random, when a sample is used to estimate a population parameter, a conclusion obtained is always uncertain. Therefore, an interval estimation method in mathematical statistics may be used to estimate a probability that an error between an estimated value and the population parameter is within a certain allowable range, and the corresponding probability is referred to as confidence. For example, it is assumed that a preset emotion classification is related to a variable for representing the emotion classification, that is, the emotion classification may correspond to different values according to a size of the variable. When the confidence of a voice text emotion recognition result needs to be obtained, a plurality of measurement values of the variable are first obtained through a plurality of processes of the first emotion recognition/second text emotion recognition, and then an average of the plurality of measurement values is taken as an estimated value. Then a probability that an error between the estimated value and a truth value of the variable is within a certain range is estimated by using an interval estimation method. The larger the probability, the more accurate the estimated value, that is, the higher the confidence of the current emotion classification. It should be understood that, the foregoing variables for representing emotion classifications may be determined according to a specific algorithm of emotion recognition, which is not limited in the present invention.

Step 1202: determining whether an emotion classification with a highest confidence in the first text emotion recognition result is the same as an emotion classification with a highest confidence in the second text emotion recognition result. If a result of the determining is yes, step 1203 is performed; otherwise step 1204 is performed.

Step 1203: using the emotion classification having a highest confidence in the first text emotion recognition result or the emotion classification having a highest confidence in the second text emotion recognition result as the text emotion recognition result.

In this case, it indicates that an emotion classification with highest reliability in the first text emotion recognition result and an emotion classification with highest reliability in the second text emotion recognition result are the same, and therefore the same emotion classification with highest reliability is directly used as a final text emotion recognition result. For example, when the first text emotion recognition result includes a satisfaction classification (confidence is a1) and a calm classification (confidence is a2), and the second text emotion recognition result includes only the satisfaction classification (confidence is b1), and when a1>a2, the satisfaction classification is used as the final text emotion recognition result.

Step 1204: comparing confidence of the emotion classification having a highest confidence in the first text emotion recognition result with confidence of the emotion classification having a highest confidence in the second text emotion recognition result.

In an embodiment of the present invention, it is considered that in an actual application scenario, according to a specific algorithm of emotion recognition and a limitation of a type and a content of the user voice message, one of the first text emotion recognition result and the second text emotion recognition result may be selected as primarily considered text emotion recognition result output, and the other is used as secondarily considered text emotion recognition result output, and then factors such as the confidence and the emotion intensity level are used to comprehensively determine the final text emotion recognition result. It should be understood that, whether the first text emotion recognition result or the second emotion recognition result is selected as the primarily considered text emotion recognition result output may be determined according to an actual scenario. Whether the first text emotion recognition result or the second text emotion recognition result is selected as the primarily considered text emotion recognition result output is not limited in the present invention.

In an embodiment of the present invention, the first text emotion recognition result is used as the primarily considered text emotion recognition result output, and the second text emotion recognition result is used as the secondarily considered text emotion recognition result output. In this case, if the confidence of the emotion classification having a highest confidence in the first text emotion recognition result is greater than the confidence of the emotion classification having a highest confidence in the second text emotion recognition result, step 1205 is performed; if the confidence of the emotion classification having a highest confidence in the first text emotion recognition result is less than the confidence of the emotion classification having a highest confidence in the second text emotion recognition result, step 1206 is performed; and if the confidence of the emotion classification having a highest confidence in the first text emotion recognition result is equal to the confidence of the emotion classification having a highest confidence in the second text emotion recognition result, step 1209 is performed.

Step 1205: using the emotion classification having a highest confidence in the first text emotion recognition result as the text emotion recognition result.

For example, when the first text emotion recognition result includes a satisfaction classification (confidence is a1) and a calm classification (confidence is a2), and the second text emotion recognition result includes only the calm classification (confidence is b1), and when a1>a2 and a1>b1, the satisfaction classification is used as the final text emotion recognition result.

Step 1206: determining whether the first text emotion recognition result includes the emotion classification having a highest confidence in the second text emotion recognition result. If a result of the determining is yes, step 1207 is performed; otherwise step 1209 is performed.

For example, when the first text emotion recognition result includes a satisfaction classification (confidence is a1) and a calm classification (confidence is a2), and the second text emotion recognition result includes only the calm classification (confidence is b1), and a1>a2 and a1<b1, it needs to determine whether the first text emotion recognition result includes the calm classification having a highest confidence in the second text emotion recognition result.

Step 1207: further determining whether an emotion intensity level of the emotion classification having a highest confidence in the second text emotion recognition result included in the first text emotion recognition result is greater than a first intensity threshold. If a result of the further determining is yes, step 1208 is performed; otherwise step 1209 is performed.

Step 1208: using the emotion classification having a highest confidence in the second text emotion recognition result as the text emotion recognition result.

In this case, it means the emotion classification having a highest confidence in the second text emotion recognition result is not only highly reliable, but also has an obvious tendency. Therefore, the emotion classification having a highest confidence in the second text emotion recognition result can be used as the text emotion recognition result. For example, when the first text emotion recognition result includes a satisfaction classification (confidence is a1) and a calm classification (confidence is a2), and the second text emotion recognition result includes only the calm classification (confidence is b1), and when a1>a2, a1<b1 and an emotion intensity level of the emotion classification in the second text emotion recognition result is greater than the first intensity threshold, the calm classification is used as the final text emotion recognition result.

Step 1209: using the emotion classification having a highest confidence in the first text emotion recognition result as the text emotion recognition result, or collectively using the emotion classification having a highest confidence in the first text emotion recognition result and the emotion classification having a highest confidence in the second text emotion recognition result as the text emotion recognition result.

It indicates that no unified emotion classification can be output as the final text emotion recognition result based on the first text emotion recognition result and the second text emotion recognition result. In this case, in an embodiment of the present invention, considering that the first text emotion recognition result is selected as the primarily considered text emotion recognition result output, the emotion classification having a highest confidence in the first text emotion recognition result is directly used as the text emotion recognition result. In another embodiment of the present invention, the first text emotion recognition result and the second text emotion recognition result may also be collectively used as the text emotion recognition result. The corresponding emotional intention information is determined in a subsequent process in combination with the text emotion recognition result and the basic intention information of a previous user voice message and/or a subsequent user voice message.

Figure 13:
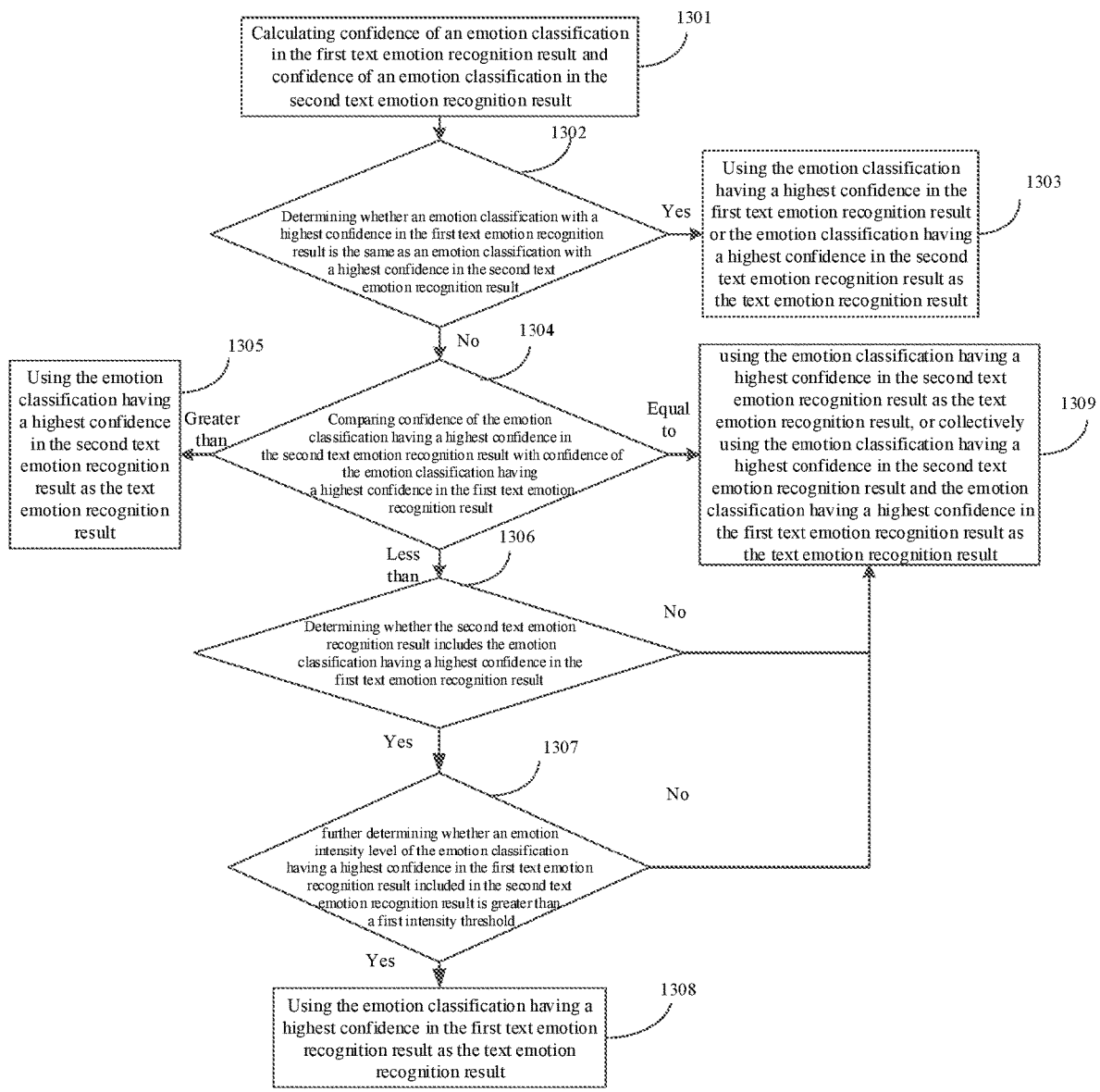
FIG. 13 is a schematic flow diagram of determining a text emotion recognition result in an intelligent interactive method provided in another embodiment of the present invention.

FIG. 13 is a schematic flow diagram of determining a text emotion recognition result in an intelligent interactive method provided in another embodiment of the present invention. Different from the embodiment shown in FIG. 12, the embodiment shown in FIG. 13 selects a second text emotion recognition result as a primarily considered text emotion recognition result output, and a first text emotion recognition result is used as a secondarily considered text emotion recognition result output. It should be understood that, a process of determining the text emotion recognition result in this case may be similar to the process logic shown in FIG. 12, and only the primarily considered text emotion recognition result output is changed to the second text emotion recognition result. Specific steps are as follows and repeated logical description will not be described again.

Step 1301: calculating confidence of an emotion classification in the first text emotion recognition result and confidence of an emotion classification in the second text emotion recognition result.

Step 1302: determining whether an emotion classification with a highest confidence in the first text emotion recognition result is the same as an emotion classification with a highest confidence in the second text emotion recognition result. If a result of the determining is yes, step 1303 is performed; otherwise step 1304 is performed.

Step 1303: using the emotion classification having a highest confidence in the first text emotion recognition result or the emotion classification having a highest confidence in the second text emotion recognition result as the text emotion recognition result.

Step 1304: comparing confidence of the emotion classification having a highest confidence in the second text emotion recognition result with confidence of the emotion classification having a highest confidence in the first text emotion recognition result.

If the confidence of the emotion classification having a highest confidence in the second text emotion recognition result is greater than the confidence of the emotion classification having a highest confidence in the first text emotion recognition result, step 1305 is performed; if the confidence of the emotion classification having a highest confidence in the second text emotion recognition result is less than the confidence of the emotion classification having a highest confidence in the first text emotion recognition result, step 1306 is performed; and if the confidence of the emotion classification having a highest confidence in the second text emotion recognition result is equal to the confidence of the emotion classification having a highest confidence in the first text emotion recognition result, step 1309 is performed.

Step 1305: using the emotion classification having a highest confidence in the second text emotion recognition result as the text emotion recognition result.

Step 1306: determining whether the second text emotion recognition result includes the emotion classification having a highest confidence in the first text emotion recognition result. If a result of the determining is yes, step 1307 is performed; otherwise step 1309 is performed.

Step 1307: further determining whether an emotion intensity level of the emotion classification having a highest confidence in the first text emotion recognition result included in the second text emotion recognition result is greater than a first intensity threshold. If a result of the further determining is yes, step 1308 is performed; otherwise step 1309 is performed.

Step 1308: using the emotion classification having a highest confidence in the first text emotion recognition result as the text emotion recognition result.

Step 1309: using the emotion classification having a highest confidence in the second text emotion recognition result as the text emotion recognition result, or collectively using the emotion classification having a highest confidence in the second text emotion recognition result and the emotion classification having a highest confidence in the first text emotion recognition result as the text emotion recognition result.

It should be understood that, although the embodiments in FIG. 12 and FIG. 13 provide examples of determining the text emotion recognition result, a process of collectively determining the text emotion recognition result according to the first text emotion recognition result and the second text emotion recognition result may be implemented in another manner depending on different specific forms of the first text emotion recognition result and the second text emotion recognition result, which is not limited to the embodiments shown in FIG. 12 and FIG. 13, and the present invention is not limited thereto.

In an embodiment of the present invention, the first text emotion recognition result and the second text emotion recognition result respectively correspond to a coordinate point in the multi-dimensional emotion space. In this case, coordinate values of the coordinate points of the first text emotion recognition result and the second text emotion recognition result in the multi-dimensional emotion space are subjected to weighted averaging processing, and coordinate points obtained by the weighted average processing are used as the text emotion recognition result. For example, when a PAD three-dimensional emotion model is used, the first text emotion recognition result is represented as (p1, a1, d1), and the second text emotion recognition result is represented as (p2, a2, d2), then a final text emotion recognition result may be represented as ((P1+p2)/2, (a1+1.3*a2)/2, (d1+0.8*d2)/2), where 1.3 and 0.8 are weight coefficients. The use of a non-discrete dimensional emotion model makes it easier to calculate the final text emotion recognition result in a quantitative manner. However, it should be understood that the combination of the two is not limited to the foregoing weighted average processing, and a specific manner is not limited in the present invention.

Figure 14:
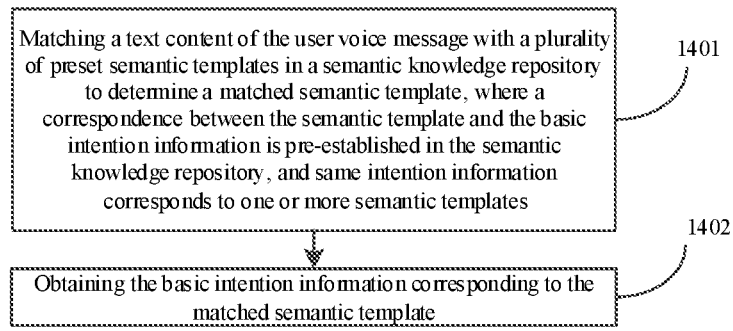
FIG. 14 is a schematic flow diagram of obtaining basic intention information according to a user voice message in an intelligent interactive method provided in an embodiment of the present invention.

FIG. 14 is a schematic flow diagram of obtaining basic intention information according to a user voice message in an intelligent interactive method provided in an embodiment of the present invention. As shown in FIG. 14, a process of the obtaining the basic intention information may include the following steps.

Step 1401: matching a text content of the user voice message with a plurality of preset semantic templates in a semantic knowledge repository to determine a matched semantic template, where a correspondence between the semantic template and the basic intention information is pre-established in the semantic knowledge repository, and same intention information corresponds to one or more semantic templates.

It should be understood that, semantic matching based on semantic templates (such as standard questions, extension questions and other semantic templates) is just an implementation manner. A vector feature of characters, words, and sentences in voice text information input by a user may also be directly extracted through a network (attention mechanism is possibly added) and used for matching or classification.

Step 1402: obtaining the basic intention information corresponding to the matched semantic template.

In an embodiment of the present invention, the text content of the user voice message may correspond to a "standard question" in the semantic knowledge repository, and the "standard question" is a text used to represent a certain knowledge point, aiming at clear expression and convenient maintenance. The "question" herein should not be interpreted narrowly as "inquiry", but should broadly understand as "input", which has a corresponding "output". When a user inputs to an intelligent interactive machine, an ideal situation is to use a standard question, then an intelligent semantic recognition system of a machine may immediately understand the meaning of the user.

However, users often do not use the standard questions, but some variants of standard questions, namely, extension questions. Therefore, for intelligent semantic recognition, extension questions of standard questions are required in the repository. The extension questions are slightly different from the standard questions in expression, but they are same in meaning. Therefore, in a further embodiment of the present invention, the semantic template is a set of one or more semantic expressions representing a certain semantic content, which is generated by a developer according to a predetermined rule in combination with the semantic content, that is, a statement of a plurality of different expressions of the corresponding semantic content may be described by using a semantic template, so as to cope with various variants of the text content of the user voice message. In this way, the text content of the user message is matched with the preset semantic template, avoiding a limitation of using a "standard question" that can only describe one expression to identify a user message.

For example, abstract semantics are used to further abstract ontology class attributes. A class of abstract semantics describes different expressions of the class of abstract semantics through a set of abstract semantic expressions. To express more abstract semantics, these abstract semantic expressions are expanded in composition elements.

It should be understood that, a specific content and a word class of a semantic component word, a specific content and a word class of a semantic rule word and definition and matching of a semantic symbol may be preset by a developer according to a specific interactive service scenario in which the intelligent interactive method is applied, and the present invention is not limited thereto.

In an embodiment of the present invention, a process of determining the matched semantic template based on the text content of the user voice message may be implemented by using a similarity calculation process. Specifically, a plurality of text similarities between the text content of the user voice message and the plurality of preset semantic templates are calculated, and then a semantic template with a highest text similarity is used as the matched semantic template. The similarity may be calculated by using one or more of the following methods: an edit distance calculation method, an n-gram calculation method, a JaroWinkler calculation method, and a Soundex calculation method. In a further embodiment, when the semantic component word and the semantic rule word in the text content of the user voice message are recognized, the semantic component word and the semantic rule word included in the user voice message and the semantic template may also be converted into simplified text strings, to improve efficiency of the semantic similarity calculation.

In an embodiment of the present invention, as described above, the semantic template may be composed of semantic component words and semantic rule words, and the semantic component words and semantic rule words are related to part of speech of the words in the semantic template and grammatical relations between the words. Therefore, the similarity calculation process may be specifically as follows: first identifying the words, the part of speech of the words, and the grammatical relations in the text of the user voice message, then identifying the semantic component words and the semantic rule words according to the part of speech and the grammatical relations of the words, and then introducing the identified semantic component words and semantic rule words into a vector space model to calculate a plurality of similarities between the text content of the user voice message and the plurality of preset semantic templates. In an embodiment of the present invention, the words, the part of speech of the words, and the grammatical relations between the words in the text content of the user voice message may be identified by using one or more of the following word segmentation methods: a Hidden Markov model method, a forward The maximum matching method, a reverse maximum matching method, and a named entity recognition method.

In an embodiment of the present invention, as described above, the semantic template may be a set of a plurality of semantic expressions representing a particular semantic content. In this case, and a statement of a plurality of different expressions of the corresponding semantic content may be described by a semantic template, so as to correspond to a plurality of extension questions of a same standard question. Therefore, when the semantic similarity between the text content of the user voice message and the preset semantic template is calculated, it is required to calculate a similarity between the text content of the user voice message and at least one extension question of each of the plurality of preset semantic templates, and then a semantic template corresponding to an extension question having a highest similarity is used as the matched semantic template. These expanded extension questions may be obtained from semantic component words and/or semantic rule words and/or semantic symbols included in the semantic template.

It should be understood that the method for obtaining the basic intention information is not limited thereto, and the voice text information input by a user may be directly matched by directly extracting a vector feature of characters, words, and sentences (for example, attention mechanism is possibly added) or may be classified into the basic intention information.

It can be seen that, according to the intelligent interactive method provided in the embodiment of the present invention, an intelligent interactive manner that provides different response services according to different user emotional states may be implemented, thereby greatly improving the experience of intelligent interactions. For example, when the intelligent interactive method provided in the embodiment of the present invention is applied to a physical robot in the field of bank customer service, a user asks a physical customer service robot in voice: "How to report the loss of the credit card?". The physical customer service robot receives the user voice message through a microphone, obtains an audio emotion recognition result of "anxiety" by analyzing audio data of the user voice message, and uses the audio emotion recognition result as a final emotion recognition result; the physical customer service robot converts the user voice message into text, to obtain customer's basic intention information, that is, "Reporting the loss of the credit card" (this step may also need to combine a previous or subsequent user voice message and a semantic knowledge repository of the banking field); then the emotion recognition result "anxiety" and basic intention information "reporting the loss of the credit card" are linked together to obtain emotional intention information "Reporting the loss of credit card. The user is very anxious, and his credit card may be lost or stolen" (this step may also need to combine a previous or subsequent user voice message and a semantic knowledge repository of the banking field); the corresponding interactive instructions are determined as follows: output steps for reporting the loss of the credit card on the screen, and simultaneously present an emotion classification "comfort" through voice broadcast, where an emotion intensity level is high, and the voice broadcast that outputs to the user and meets the emotional command may be a light and medium-speed speech: "Steps for reporting the loss of the credit card can be seen on the screen, please do not worry. If your credit card is lost or stolen, it will be frozen immediately after you report the loss of your card. This will not cause any loss of your property and reputation . . . ".

In an embodiment of the present invention, voice broadcast operation is prevented for consideration of privacy of an interactive content in some application scenarios (such as bank customer service), and instead interactive instructions are implemented in plain text or animation. Mode selection of such interactive instructions may be adjusted according to an application scenario.

It should be understood that, a manner of presenting emotion classifications and emotion intensity levels in the interactive instructions may be implemented by adjusting speed and intonation of voice broadcast, and the present invention is not limited thereto.

For another example, when the intelligent interactive method provided in this embodiment of the present invention is applied to a virtual intelligent personal assistant application of an intelligent terminal device, a user inquires the intelligent terminal device in voice, "What is the fastest path from my home to the airport?". The virtual intelligent personal assistant application receives a user voice message through a microphone of the intelligent terminal device, and obtains an audio emotion recognition result of "excitement" by analyzing audio data of the user voice message; besides, it also converts the user voice message into text and obtains a text emotion recognition result of "anxiety" by analyzing contents of the text of the user voice message. After logical judgment, both emotion classification "excitement" and "anxiety" are used as emotion recognition results. In combination with a previous or subsequent user voice message and a semantic knowledge repository in the field, basic intention information of the customer is obtained as "Obtain the fastest path navigation from the user's home to the airport". For the virtual intelligent personal assistant application, when "anxiety" is associated with basic intention information "Obtain the fastest path navigation from the user's home to the airport", emotional intention information obtained is "Obtain the fastest path navigation from the user's home to the airport, the user is anxious and may worry about missing the flight"; and when "excitement" is associated with the basic intention information, emotional intention information obtained is "Obtain the fastest path navigation from the user's home to the airport, the user is excited and may be going on a trip soon". Therefore, there are two types of emotional intention information. In this case, in combination with a previous or subsequent user voice message, it is found that previously the user mentioned "My flight is at 11 o'clock, so what time do I need to leave?" Then it is determined that the user's emotion recognition result is "anxiety", and the emotional intention information is "Obtain the fastest path navigation from the user's home to the airport, the user is anxious and may worry about missing the flight". Corresponding interactive instructions are determined as follows: output the navigation information on the screen, and simultaneously present emotion classifications "comfort" and "warning" through voice broadcast, where emotion intensity levels are high respectively, and the voice broadcast that outputs to the user and meets the emotional command may be a smooth and medium-speed speech: "The fastest path from your home to the airport is planned. Please follow the navigation on the screen. You will arrive at the airport within 1 hour at normal speed. Please don't worry. Also please remember to make time planning and drive carefully, do not speeding".

For another example, when the intelligent interactive method provided in this embodiment of the present invention is applied to an intelligent wearable device, a user inquires the intelligent wearable device in voice when the user does exercise: "What's my current heart rate?". The intelligent wearable device receives the user voice message through the microphone, and obtains an audio emotion recognition result as a PAD three-dimensional emotion model vector (p1, a1, d1) by analyzing audio data of the user voice message, and also obtains a text emotion recognition result as a PAD three-dimensional emotion model vector (p2, a2, d2) by analyzing the audio data of the user voice message. In combination with the audio emotion recognition result and the text emotion recognition result, a final emotion recognition result (p3, a3, d3) is obtained, which represents combination of "worry" and "tension". In the meantime, the intelligent wearable device obtains basic intention information of the customer by combining a semantic knowledge repository in the medical and health field as "Obtain the user's heart rate data". Next, the emotion recognition result (p3, a3, d3) is associated with the basic intention "Obtain the user's heart rate data", and emotional intention information is obtained as "Obtain the user's heart rate data, the user is worried, and currently may have symptoms such as rapid heartbeat". Interactive instructions are determined according to a correspondence between the emotional intention information and the interactive instructions: output the heart rate data and simultaneously present emotion (p6, a6, d6), namely, combination of "comfort" and "encouragement", where emotion intensity levels are high, respectively; also start the program of real-time monitoring heart rate and keep 10 minutes, and broadcast in a light, slow speech in voice: "Your current heart rate is 150 times per minute, please don't worry, this is still in the normal heart rate range. If you feel uncomfortable, such as rapid heartbeat, please relax and take a deep breath. Your past health data shows that your heart works well, and you may enhance heart and lung function by maintaining regular exercise". Then continuous attention is paid to the user's emotional state. If the user says "feeling uncomfortable" after 5 minutes, and through an emotion recognition process, an emotion recognition result is obtained as a three-dimensional emotion model vector (p'7, a7, d7), representing "pain", then the interactive instructions are updated as: output the heart rate data, and simultaneously present emotion (p8, a8, D8), namely, "warning" through voice broadcast, where emotion intensity levels are high respectively, output alarm tone, and broadcast in a steady and slow speech: "Your current heart rate is 170 times per minute, which has exceeded the normal range. Please stop exercise and adjust your breathing. If you need any help, please press the screen."

Figure 15:
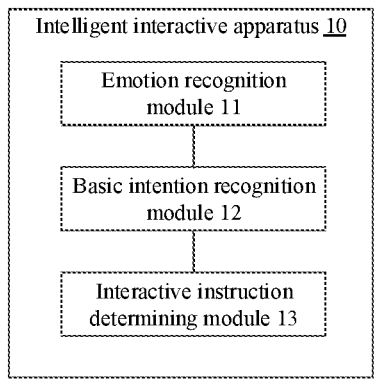
FIG. 15 is a schematic structural diagram of an intelligent interactive apparatus provided in an embodiment of the present invention.

FIG. 15 is a schematic structural diagram of an intelligent interactive apparatus provided in an embodiment of the present invention. As shown in FIG. 15, an intelligent interactive apparatus 10 includes: an emotion recognition module 11, a basic intention recognition module 12, and an interactive instruction determining module 13.

The emotion recognition module 11 is configured to obtain an emotion recognition result according to a user message, where the user message includes at least a user voice message. The basic intention recognition module 12 is configured to perform an intention analysis according to a text content of the user voice message to obtain corresponding basic intention information. The interactive instruction determining module 13 is configured to determine a corresponding interactive instruction according to the emotion recognition result and the basic intention information.

According to the intelligent interactive apparatus 10 provided in the embodiment of the present invention, on the basis of understanding the basic intention information of a user, in combination with the emotion recognition result obtained based on the user message, the interactive instruction with emotion is further given based on the basic intention information and the emotion recognition result. This solves problems that a deep intention of a user message cannot be analyzed in an intelligent interactive manner in the prior art and humanized interactive experiences cannot be provided.

Figure 16:
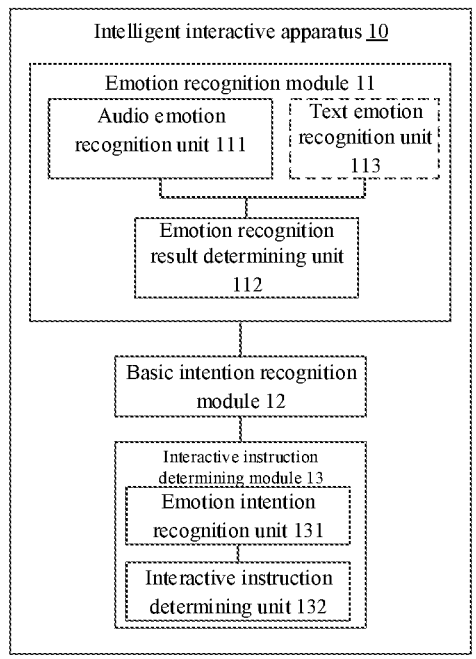
FIG. 16 is a schematic structural diagram of an intelligent interactive apparatus provided in an embodiment of the present invention.

In an embodiment of the present invention, as shown in FIG. 16, the interactive instruction determining module 13 includes: an emotion intention recognition unit 131 and an interactive instruction determining unit 132. The emotion intention recognition unit 131 is configured to determine a corresponding emotional intention information according to an emotion recognition result and basic intention information. The interactive instruction determining unit 132 is configured to determine a corresponding interactive instruction according to the emotional intention information, or determining a corresponding interactive instruction according to the emotional intention information and the basic intention information.

In an embodiment of the present invention, the interactive instruction includes presenting a feedback content for the emotional intention information. For example, in some customer service interactive scenarios, it needs to present emotional intention information obtained through analysis based on a voice content of a customer to customer service personnel to serve as a reminder function. In this case, it is necessary to determine corresponding emotional intention information, and present a feedback content of the emotional intention information.

In an embodiment of the present invention, the interactive instruction includes one or more of the following sentiment presentation modes: a text output sentiment presentation mode, a music play sentiment presentation mode, a voice sentiment presentation mode, an image sentiment presentation mode, and a mechanical action sentiment presentation mode.

In an embodiment of the present invention, the emotional intention information includes sentiment need information corresponding to the emotion recognition result, or the emotional intention information includes sentiment need information corresponding to the emotion recognition result and an association relationship between the emotion recognition result and the basic intention information.

In an embodiment of the present invention, the association relationship between the emotion recognition result and the basic intention information is predefined.

In an embodiment of the present invention, the user message includes at least the user voice message, where the emotion recognition module 11 is further configured to obtain the emotion recognition result according to the user voice message.

In an embodiment of the present invention, as shown in FIG. 16, the emotion recognition module 11 may include: an audio emotion recognition unit 111, configured to obtain an audio emotion recognition result according to audio data of the user voice message; and an emotion recognition result determining unit 112, configured to determine an emotion recognition result according to the audio emotion recognition result.

Alternatively, the emotion recognition module 11 includes: an audio emotion recognition unit 111, configured to obtain an audio emotion recognition result according to audio data of the user voice message; a text emotion recognition unit 113, configured to obtain a text emotion recognition result according to a text content of the user voice message; and an emotion recognition result determining unit 112, configured to determine an emotion recognition result according to the audio emotion recognition result and the text emotion recognition result.

In an embodiment of the present invention, the audio emotion recognition result includes one or more of a plurality of emotion classifications; or the audio emotion recognition result corresponds to one coordinate point in a multi-dimensional emotion space; or, the audio emotion recognition result and the text emotion recognition result respectively include one or more of a plurality of emotion classifications; or the audio emotion recognition result and the text emotion recognition result respectively correspond to one coordinate point in a multi-dimensional emotion space, where each dimension in the multi-dimensional emotion space corresponds to a psychologically defined sentiment factor, and each of the emotion classifications includes a plurality of emotion intensity levels.

Figure 17:
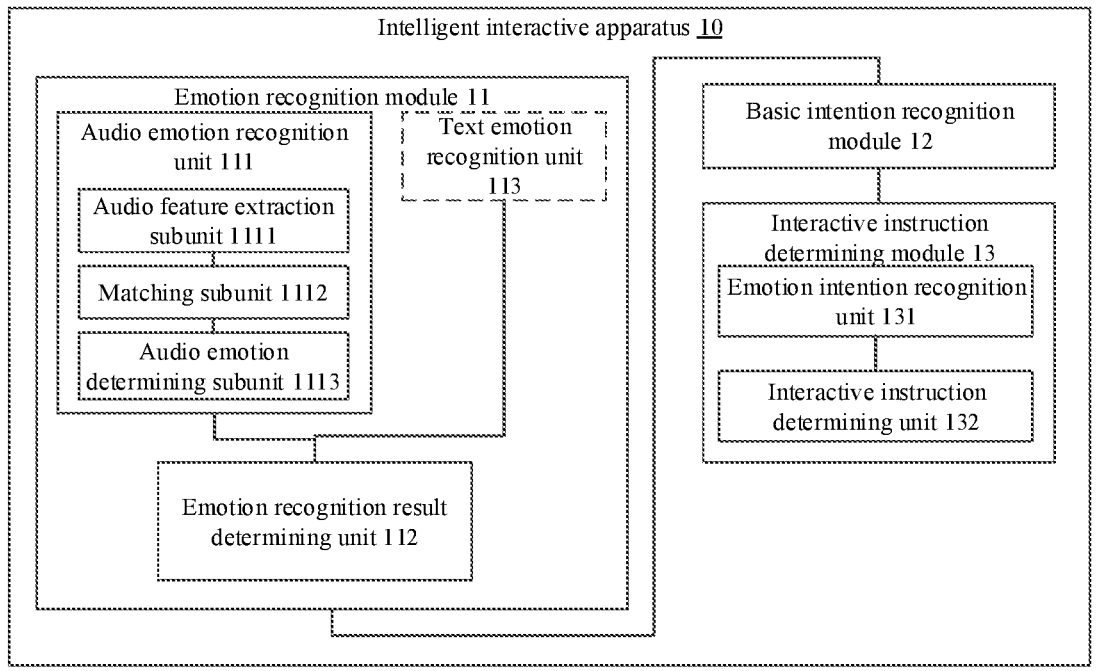
FIG. 17 is a schematic structural diagram of an intelligent interactive apparatus provided in an embodiment of the present invention.

FIG. 17 is a schematic structural diagram of an intelligent interactive apparatus provided in an embodiment of the present invention. As shown in FIG. 17, the audio emotion recognition unit 111 in the intelligent interactive apparatus 10 includes: an audio feature extraction subunit 1111, a matching subunit 1112, and an audio emotion determining subunit 1113.

The audio feature extraction subunit 1111 is configured to extract an audio feature vector of the user voice message, where the user voice message corresponds to a segment of the to-be-identified audio stream. The matching subunit 1112 is configured to match the audio feature vector of the user voice message with a plurality of emotional feature models, where the plurality of emotional feature models respectively correspond to one of a plurality of emotion classifications. The audio emotion determining subunit 1113 is configured to use an emotion classification corresponding to the emotional feature model that is matched as an emotion classification of the user voice message.

Figure 18:
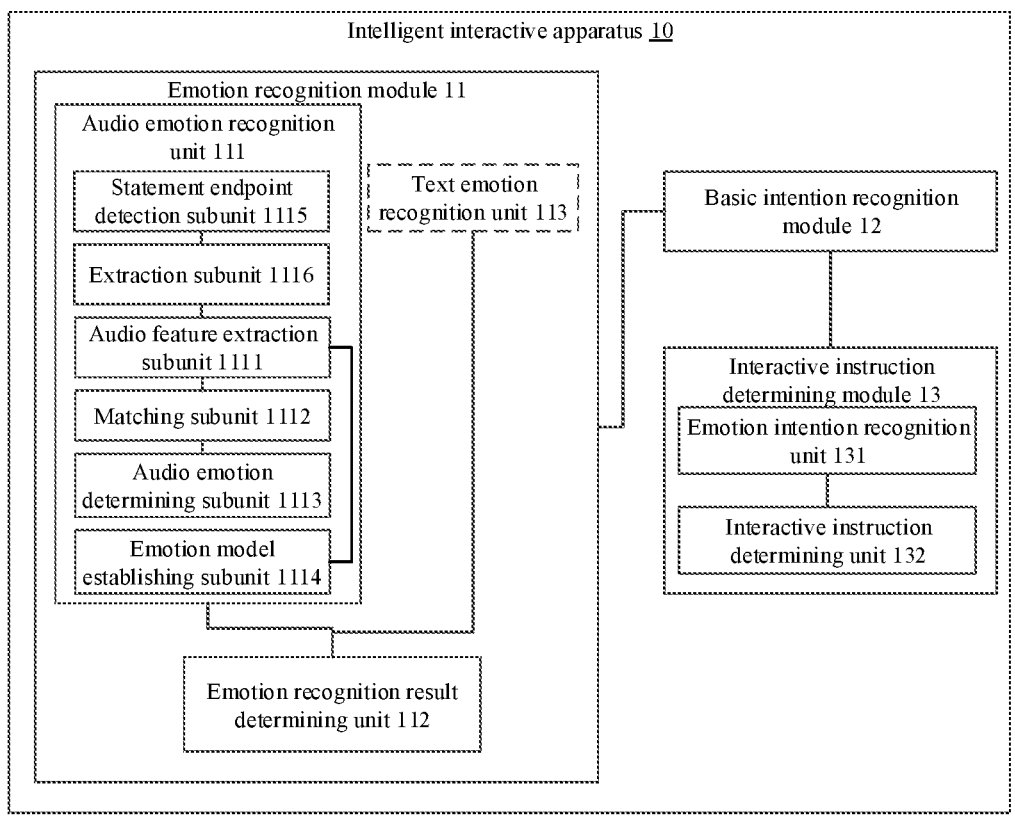
FIG. 18 is a schematic structural diagram of an intelligent interactive apparatus provided in an embodiment of the present invention.

In an embodiment of the present invention, as shown in FIG. 18, the audio emotion recognition unit 111 further includes: an emotion model establishing subunit 1114, configured to establish a plurality of emotional feature models by pre-learning respective audio feature vectors of a plurality of preset voice segments including emotion classification labels corresponding to the plurality of emotion classifications.

In an embodiment of the present invention, the emotion model establishing subunit 1114 includes: a clustering subunit and a training subunit. The clustering subunit is configured to perform clustering processing on the respective audio feature vector sets of the plurality of preset voice segments including the emotion classification labels corresponding to the plurality of emotion classifications, to obtain a clustering result of a preset emotion classification. The training subunit is configured to train, according to the clustering result, an audio feature vector set of the preset voice segment in each cluster to be an emotional feature model.

In an embodiment of the present invention, as shown in FIG. 18, the audio emotion recognition unit 111 further includes: a statement endpoint detection subunit 1115 and an extraction subunit 1116. The statement endpoint detection subunit 1115 is configured to determine a voice start frame and a voice end frame in a to-be-identified audio stream. The extraction subunit 1116 is configured to extract an audio stream portion between the voice start frame and the voice end frame as the user voice message.

In an embodiment of the present invention, the sentence endpoint detection subunit 1115 includes: a first determining subunit, a voice start frame determining subunit, and a voice end frame determining subunit.

The first determining subunit is configured to determine whether a voice frame in the to-be-identified audio stream is a speech frame or a non-speech frame. The voice start frame determining subunit is configured to: after the voice end frame of a previous voice segment, or the first voice segment is not yet identified, and when a first preset quantity of voice frames are consecutively determined as speech frames, use the first voice frame of the first preset quantity of the voice frames as the voice start frame of a current voice segment. The voice end frame determining subunit is configured to: after the voice start frame of the current voice segment, and when a second preset quantity of voice frames are consecutively determined as non-speech frames, use the first voice frame of the second preset quantity of the voice frames as the voice end frame of the current voice segment.

In an embodiment of the present invention, the audio feature vector includes one or more of the following features: an energy feature, a speech frame number feature, a pitch frequency feature, a formant feature, a harmonic to noise ratio feature, and a mel-frequency cepstral coefficient feature.

In an embodiment of the present invention, the energy feature may include a first-order difference of short-term energy, and/or an energy level with a frequency below a preset frequency; and/or the pitch frequency feature includes a pitch frequency and/or a first-order difference of a pitch frequency; and/or the formant feature includes one or more of the following: a first formant, a second formant, a third formant, a first-order difference of the first formant, a first-order difference of the second formant, and a first-order difference of the third formant; and/or, the mel-frequency cepstral coefficient feature includes a 1-12 order mel-frequency cepstral coefficient and/or a first-order difference of a 1-12 mel-frequency cepstral coefficient.

In an embodiment of the present invention, the audio feature is represented by one or more of the following computational representation manners: a proportion value, an average value, a maximum value, a median value, and a standard deviation.

In an embodiment of the present invention, the energy feature includes an average value, a maximum value, a median value, and a standard deviation of a first-order difference of short-term energy, and/or a proportion value of energy with frequency below a preset frequency to total energy; and/or the speech frame number feature includes: a proportion value of a quantity of speech frames to a quantity of non-speech frames, and/or a proportion value of a quantity of speech frames to total quantity of frames; and/or the pitch frequency feature includes: an average value, a maximum value, a median value, and a standard deviation of a pitch frequency, and/or an average value, a maximum value, a median value, and a standard deviation of a first-order difference of a pitch frequency; and/or, the formant feature includes one or more of the following: an average value, a maximum value, a median value, and a standard deviation of a first formant; an average value, a maximum value, a median value, and a standard deviation of a second formant, an average value, a maximum value, a median value, and a standard deviation of a third formant, an average value, a maximum value, a median value, and a standard deviation of a first-order difference of the first formant, an average value, a maximum value, a median value, and a standard deviation of a first-order difference of the second formant, and an average value, a maximum value, a median value, and a standard deviation of a first-order difference of the third formant; and/or, the mel-frequency cepstral coefficient feature includes an average value, a maximum value, a median value, and a standard deviation of a 1-12 order mel-frequency cepstral coefficient, and/or an average value, a maximum value, a median value, and a standard deviation of a first-order difference of a 1-12 order mel-frequency cepstral coefficient.

Figure 19:
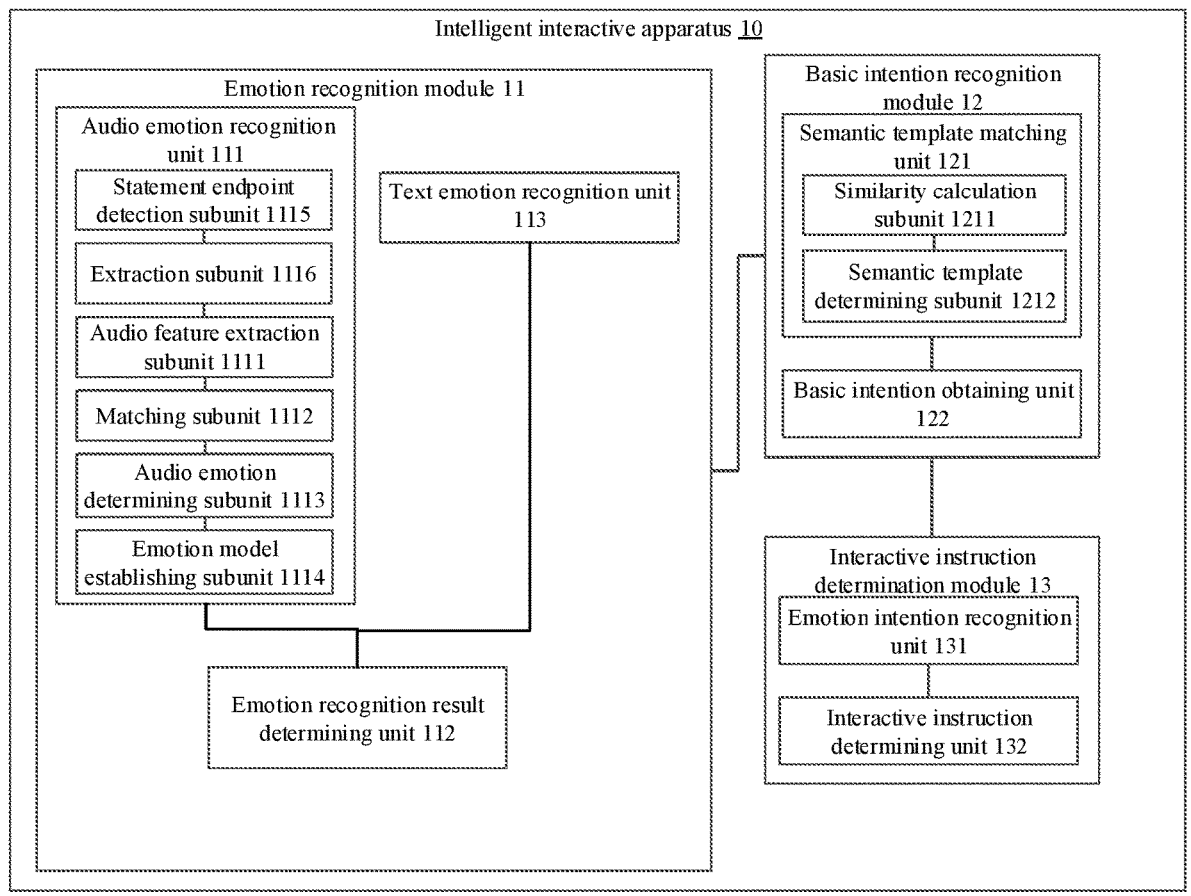
FIG. 19 is a schematic structural diagram of an intelligent interactive apparatus provided in an embodiment of the present invention.

FIG. 19 is a schematic structural diagram of an intelligent interactive apparatus provided in an embodiment of the present invention. As shown in FIG. 19, the basic intention recognition module 12 in intelligent interactive apparatus 10 includes a semantic template matching unit 121 and a basic intention obtaining unit 122.

The semantic template matching unit 121 is configured to match a text content of the user voice message with a plurality of preset semantic templates in a semantic knowledge repository to determine a matched semantic template. The basic intention obtaining unit 122 is configured to obtain the basic intention information corresponding to the matched semantic template. A correspondence between the semantic template and the basic intention information is pre-established in the semantic knowledge repository, and same intention information corresponds to one or more semantic templates.

In an embodiment of the present invention, the semantic template matching unit 121 includes a similarity calculation subunit 1211 and a semantic template determining subunit 1212.

The similarity calculation subunit 1211 is configured to perform calculation on a similarity between the text content of the user voice message and the plurality of preset semantic templates. The semantic template determining subunit 1212 is configured to use a semantic template with a highest similarity as the matched semantic template.

In an embodiment of the present invention, a correspondence between the emotional intention information and both the emotion recognition result and the basic intention information is pre-established; or a correspondence between the emotional intention information and the interactive instruction is pre-established; or a correspondence between the interactive instruction and both the emotional intention information and the basic intention information is pre-established.

In an embodiment of the present invention, in order to further improve accuracy of obtaining basic intention information, the basic intention recognition module 12 is further configured to perform intention analysis according to the current user voice message, in combination with a previous user voice message and/or a subsequent user voice message, to obtain the corresponding basic intention information.

In an embodiment of the present invention, in order to further improve accuracy of obtaining emotional intention information, the intelligent interactive apparatus 10 further includes: a first recording module, configured to record the emotion recognition result and the basic intention information of the user voice message. The emotion intention recognition unit 131 is further configured to determine the corresponding emotional intention information according to the emotion recognition result and the basic intention information of the current user voice message, in combination with the emotion recognition result and the basic intention information of a previous user voice message and/or a subsequent user voice message.

In an embodiment of the present invention, in order to further improve accuracy of obtaining an interactive instruction, the intelligent interactive apparatus 10 further includes: a second recording module, configured to record the emotional intention information and the basic intention information of the user voice message. The interactive instruction determining unit 132 is further configured to determine the corresponding interactive instruction according to the emotional intention information and the basic intention information of the current user voice message, in combination with the emotional intention information and the basic intention information of a previous user voice message and/or a subsequent user voice message.

It should be understood that, each module or unit described in the intelligent interactive apparatus 10 provided in the foregoing embodiments corresponds to one method step described above. Therefore, the operations, features, and effects described in the foregoing method steps are equally applicable to the intelligent interactive apparatus 10 and the corresponding modules and units included therein, and the repeated contents is not described herein again.

An embodiment of the present invention further provides a computer device, including a memory, a processor, and a computer program stored on the memory for execution by the processor, where when executing the computer program, the processor implements the intelligent interactive method according to any one of the foregoing embodiments.

An embodiment of the present invention further provides a computer readable storage medium on which a computer program is stored, where when executed by a processor, the computer program implements the intelligent interactive method according to any one of the foregoing embodiments. The computer storage medium may be any tangible media, such as floppy disk, a CD-ROM, a DVD, a hard drive, or even a network medium.

It should be understood that, although one implementation form of the foregoing implementation manner of the present invention may be a computer program product, the method or apparatus of the implementation manner of the present invention may be implemented in software, hardware, or a combination of software and hardware. The hardware portion may be implemented by using dedicated logic; the software portion can be stored in a memory and executed by an appropriate instruction execution system, such as a microprocessor or dedicated design hardware. Those skilled in the art may understand that the foregoing methods and device may be implemented by using computer-executable instructions and/or embodied in processor control code, for example, such code is provided on a carrier medium such as a magnetic disk, CD or DVD-ROM, on a programmable memory such as a read only memory (firmware), or on a data carrier such as an optical or electronic signal carrier. The method and apparatus of the present invention may be implemented by hardware circuits such as very large scale integrated circuits or gate arrays, semiconductors such as logic chips, transistors, or programmable hardware devices such as field programmable gate arrays, programmable logic devices, may also be implemented by software executed by various types of processors, or may be implemented by a combination of the foregoing hardware circuits and software such as firmware.

It should be understood that, although several modules or units of the apparatus are referred to in the above detailed description, such division is merely exemplary but not mandatory. In fact, according to an exemplary embodiment of the present invention, the features and functions of the two or more modules/units described above may be implemented in one module/unit, and conversely, the features and functions of one module/unit described above may be further divided and implemented by a plurality of modules/units. Moreover, some of the modules/units described above may be omitted in some application scenarios.

It should be understood that the terms "first", "second", "third" and the like used in the embodiments of the present invention are merely for clear description of the technical solutions, rather than limiting the protection scope of the present invention.

The foregoing descriptions are merely preferred embodiments of the present invention and not intended to limit the present invention. Any modifications, equivalent replacements or the like made without departing from the spirit and principle of the present invention shall be regarded as falling into the protection scope of the present invention.

The foregoing descriptions are merely preferred embodiments of the present invention, rather than limiting the protection scope of the present invention. Any modification, equivalent alteration, improvement or the like within the spirit and principle of the invention shall fall into the protection scope of the invention.

What is claimed is:

1. An intelligent interactive method, comprising:
   obtaining an emotion recognition result according to a user message, wherein the user message comprises at least a user voice message;
   performing an intention analysis according to a text content of the user voice message to obtain corresponding basic intention information; and
   determining corresponding emotional intention information according to the emotion recognition result and the basic intention information, wherein the emotional intention information refers to intention information having emotional meaning, which can reflect the emotional needs of the user message while reflecting the basic intention; and
   determining a corresponding interactive instruction according to the emotional intention information, or determining the corresponding interactive instruction according to the emotional intention information and the basic intention information;
   determining an intonation and a speaking speed of a voice broadcast according to the emotional intention information;
   outputting the voice broadcast corresponding to the interactive instruction to the user at the intonation and the speaking speed;
   wherein the determining corresponding emotional intention information according to the emotion recognition result and the basic intention information comprises:
   determining corresponding emotional intention information according to the emotion recognition result and the basic intention information, in combination with an emotion recognition result and basic intention information of a previous user voice message and/or a subsequent user voice message.

2. The intelligent interactive method according to claim 1, wherein the method comprises:
   determining a message type according to interactive scenario, the message type comprises one or more of following: facial expression, action posture, voice, and text;
   obtaining the user message corresponding to the message type.

3. The intelligent interactive method according to claim 1, wherein the interactive instruction comprises one or more of the following sentiment presentation modes: a text output sentiment presentation mode, a music play sentiment presentation mode, a voice sentiment presentation mode, an image sentiment presentation mode, and a mechanical action sentiment presentation mode.

4. The intelligent interactive method according to claim 1, wherein the emotional intention information comprises sentiment need information corresponding to the emotion recognition result; or
   the emotional intention information comprises the sentiment need information corresponding to the emotion recognition result and an association relationship between the emotion recognition result and the basic intention information.

5. The intelligent interactive method according to claim 1, wherein the user message comprises at least a user voice message;
   and the obtaining an emotion recognition result according to an obtained user message comprises: obtaining the emotion recognition result according to the user voice message.

6. The intelligent interactive method according to claim 1, wherein the obtaining an emotion recognition result according to a user message comprises:
   obtaining an audio emotion recognition result according to audio data of the user voice message, and obtaining a text emotion recognition result according to the text content of the user voice message;
   obtaining an emotion recognition result according to the audio emotion recognition result and the text emotion recognition result;
   wherein the audio emotion recognition result and the text emotion recognition result respectively correspond to one coordinate point in a multi-dimensional emotion space,
   wherein each dimension in the multi-dimensional emotion space corresponds to a psychologically defined sentiment factor, and each of the emotion classifications comprises a plurality of emotion intensity levels; and
   the obtaining an emotion recognition result according to the audio emotion recognition result and the text emotion recognition result comprises:
   obtaining coordinate points by weighting averaging processing of coordinate values of the coordinate point of the audio emotion recognition result and the coordinate point of the text emotion recognition result in the multi-dimensional emotion space;
   using the coordinate points as the emotion recognition result.

7. The intelligent interactive method according to claim 1, wherein the obtaining an audio emotion recognition result according to audio data of the user voice message comprises:
   extracting an audio feature vector of the user voice message, wherein the user voice message corresponds to a segment of a to-be-identified audio stream;
   matching the audio feature vector of the user voice message with a plurality of emotional feature models, wherein the plurality of emotional feature models respectively correspond to one of a plurality of emotion classifications; and
   using an emotion classification corresponding to the emotional feature model that is matched as an emotion classification of the user voice message.

8. The intelligent interactive method according to claim 7, wherein the plurality of emotional feature models are established by pre-learning respective audio feature vector sets of a plurality of preset voice segments comprising emotion classification labels corresponding to the plurality of emotion classifications.

9. The intelligent interactive method according to claim 8, wherein the pre-learning process comprises:
- performing clustering processing on the respective audio feature vector sets of the plurality of preset voice segments comprising the emotion classification labels corresponding to the plurality of emotion classifications, to obtain a clustering result of a preset emotion classification; and
- training, according to the clustering result, an audio feature vector set of the preset voice segment in each cluster to be one of the emotional feature models.

10. The intelligent interactive method according to claim 7, wherein the obtaining an audio emotion recognition result according to audio data of the user voice message further comprises:
- determining a voice start frame and a voice end frame in the to-be-identified audio stream; and
- extracting an audio stream portion between the voice start frame and the voice end frame as the user voice message.

11. The intelligent interactive method according to claim 10, wherein the determining a voice start frame and a voice end frame in the to-be-identified audio stream comprises:
- determining whether a voice frame in the to-be-identified audio stream is a speech frame or a non-speech frame;
- after the voice end frame of a previous voice segment, or a first voice segment is not yet identified, and when a first preset quantity of voice frames are consecutively determined as speech frames, using the first voice frame of the first preset quantity of the voice frames as the voice start frame of a current voice segment; and
- after the voice start frame of the current voice segment, and when a second preset quantity of voice frames are consecutively determined as non-speech frames, using the first voice frame of the second preset quantity of the voice frames as the voice end frame of the current voice segment.

12. The intelligent interactive method according to claim 7, wherein the audio feature vector comprises one or more of the following audio features: an energy feature, a speech frame number feature, a pitch frequency feature, a formant feature, a harmonic to noise ratio feature, and a mel-frequency cepstral coefficient feature.

13. The intelligent interactive method according to claim 12, wherein the energy feature comprises: a first-order difference of short-term energy, and/or an energy level with a frequency below a preset frequency; and/or,
- the pitch frequency feature comprises: a pitch frequency and/or a first-order difference of a pitch frequency; and/or,
- the formant feature comprises one or more of the following: a first formant, a second formant, a third formant, a first-order difference of the first formant, a first-order difference of the second formant, and a first-order difference of the third formant; and/or,
- the mel-frequency cepstral coefficient feature comprises a 1-12 order mel-frequency cepstral coefficient and/or a first-order difference of a 1-12 mel-frequency cepstral coefficient.

14. The intelligent interactive method according to claim 12, wherein the energy feature comprises: an average value, a maximum value, a median value, and a standard deviation of a first-order difference of short-term energy, and/or a proportion value of energy with frequency below a preset frequency to total energy; and/or
- the speech frame number feature comprises: a proportion value of a quantity of speech frames to a quantity of non-speech frames, and/or a proportion value of a quantity of speech frames to total quantity of frames; and/or
- the pitch frequency feature comprises: an average value, a maximum value, a median value, and a standard deviation of a pitch frequency, and/or an average value, a maximum value, a median value, and a standard deviation of a first-order difference of a pitch frequency; and/or,
- the formant feature comprises one or more of the following: an average value, a maximum value, a median value, and a standard deviation of a first formant; an average value, a maximum value, a median value, and a standard deviation of a second formant, an average value, a maximum value, a median value, and a standard deviation of a third formant, an average value, a maximum value, a median value, and a standard deviation of a first-order difference of the first formant, an average value, a maximum value, a median value, and a standard deviation of a first-order difference of the second formant, and an average value, a maximum value, a median value, and a standard deviation of a first-order difference of the third formant; and/or,
- the mel-frequency cepstral coefficient feature comprises an average value, a maximum value, a median value, and a standard deviation of a 1-12 order mel-frequency cepstral coefficients, and/or an average value, a maximum value, a median value, and a standard deviation of a first-order difference of a 1-12 order mel-frequency cepstral coefficients.

15. The intelligent interactive method according to claim 1, wherein the performing an intention analysis according to a text content of the user voice message to obtain corresponding basic intention information comprises:
- matching the text content of the user voice message with a plurality of preset semantic templates in a semantic knowledge repository to determine a matched semantic template; and
- obtaining the basic intention information corresponding to the matched semantic template,
- wherein a correspondence between the semantic template and the basic intention information is pre-established in the semantic knowledge repository, and same intention information corresponds to one or more semantic templates.

16. The intelligent interactive method according to claim 15, wherein the matching the text content of the user voice message with a plurality of preset semantic templates to determine a matched semantic template comprises:
- performing calculation on a similarity between the text content of the user voice message and the plurality of preset semantic templates; and
- using a semantic template with a highest similarity as the matched semantic template.

17. A computer device comprising a memory, a processor, and a computer program stored on the memory for execution by the processor, wherein when executing the computer program, the processor implements steps of the method according to claim 1.

18. A computer readable storage medium on which a computer program is stored, wherein when executed by a processor, the computer program implements steps of the method according to claim 1.

19. The intelligent interactive method according to claim 1, wherein the obtaining an emotion recognition result according to the audio emotion recognition result and the text emotion recognition result comprises:

calculating confidence of an emotion classification in the audio emotion recognition result and confidence of an emotion classification in the text emotion recognition result;
obtaining the emotion recognition result according to the confidence in the audio emotion recognition result and the confidence in the text emotion recognition result.

\* \* \* \* \*